United States Patent
Kim et al.

(10) Patent No.: US 9,635,523 B2
(45) Date of Patent: Apr. 25, 2017

(54) TERMINAL FOR CREATING AND TRANSMITTING A MESSAGE AND CONTROLLING METHOD THEREOF

(71) Applicant: LG ELECTRONICS INC., Seoul (KR)

(72) Inventors: Mingoo Kim, Seoul (KR); Kwangjae Lee, Seoul (KR); Seungman Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/920,642

(22) Filed: Jun. 18, 2013

(65) Prior Publication Data

US 2013/0344905 A1 Dec. 26, 2013

Related U.S. Application Data

(60) Provisional application No. 61/663,619, filed on Jun. 24, 2012.

(30) Foreign Application Priority Data

May 21, 2013 (KR) ........................ 10-2013-0057066

(51) Int. Cl.
H04W 4/00 (2009.01)
H04W 4/12 (2009.01)
H04W 4/02 (2009.01)

(52) U.S. Cl.
CPC ................ *H04W 4/12* (2013.01); *H04W 4/02* (2013.01)

(58) Field of Classification Search
CPC ....... H04W 24/08; H04W 4/003; H04W 4/02; H04W 4/12; G07C 2011/02; G07C 9/00031; G07C 9/00103; H04M 1/72569; H04M 2203/306; H04M 2242/30
USPC .................... 455/466, 412.1, 414.3, 420, 96
See application file for complete search history.

(56) References Cited

U.S. PATENT DOCUMENTS

| | | | |
|---|---|---|---|
| 8,078,397 B1 * | 12/2011 | Zilka | 701/414 |
| 2007/0050126 A1 * | 3/2007 | Nou | G07C 5/085 701/117 |
| 2007/0072632 A1 * | 3/2007 | Alanara et al. | 455/466 |
| 2009/0061825 A1 * | 3/2009 | Neelakantan et al. | 455/412.1 |
| 2010/0050261 A1 * | 2/2010 | Park | H04W 12/10 726/24 |
| 2010/0201478 A1 * | 8/2010 | Veen et al. | 340/3.1 |
| 2010/0297981 A1 * | 11/2010 | Ballantyne et al. | 455/404.2 |
| 2011/0009127 A1 * | 1/2011 | Spjuth | H04W 4/02 455/456.1 |

(Continued)

*Primary Examiner* — Olumide T Ajibade Akonai
(74) *Attorney, Agent, or Firm* — Ked & Associates, LLP

(57) ABSTRACT

A terminal and controlling method thereof are disclosed. The present invention includes detecting whether a message transmission command is inputted in the course of driving the vehicle, when the message transmission command is inputted, creating a message including at least one information provided by at least one application provided to the terminal, and transmitting the created message.

Accordingly, a driver of a moving vehicle automatically creates and transmits a message including application and vehicle informations suitable for a predetermined format by a single manipulation, thereby facilitating the message to be transmit safely and conveniently in the course of driving the vehicle.

19 Claims, 23 Drawing Sheets

(56) References Cited

U.S. PATENT DOCUMENTS

2012/0077477 A1* 3/2012 Oh .............................. 455/414.2
2013/0309977 A1* 11/2013 Heines ...................... G06F 8/70
                                                                   455/67.7

* cited by examiner

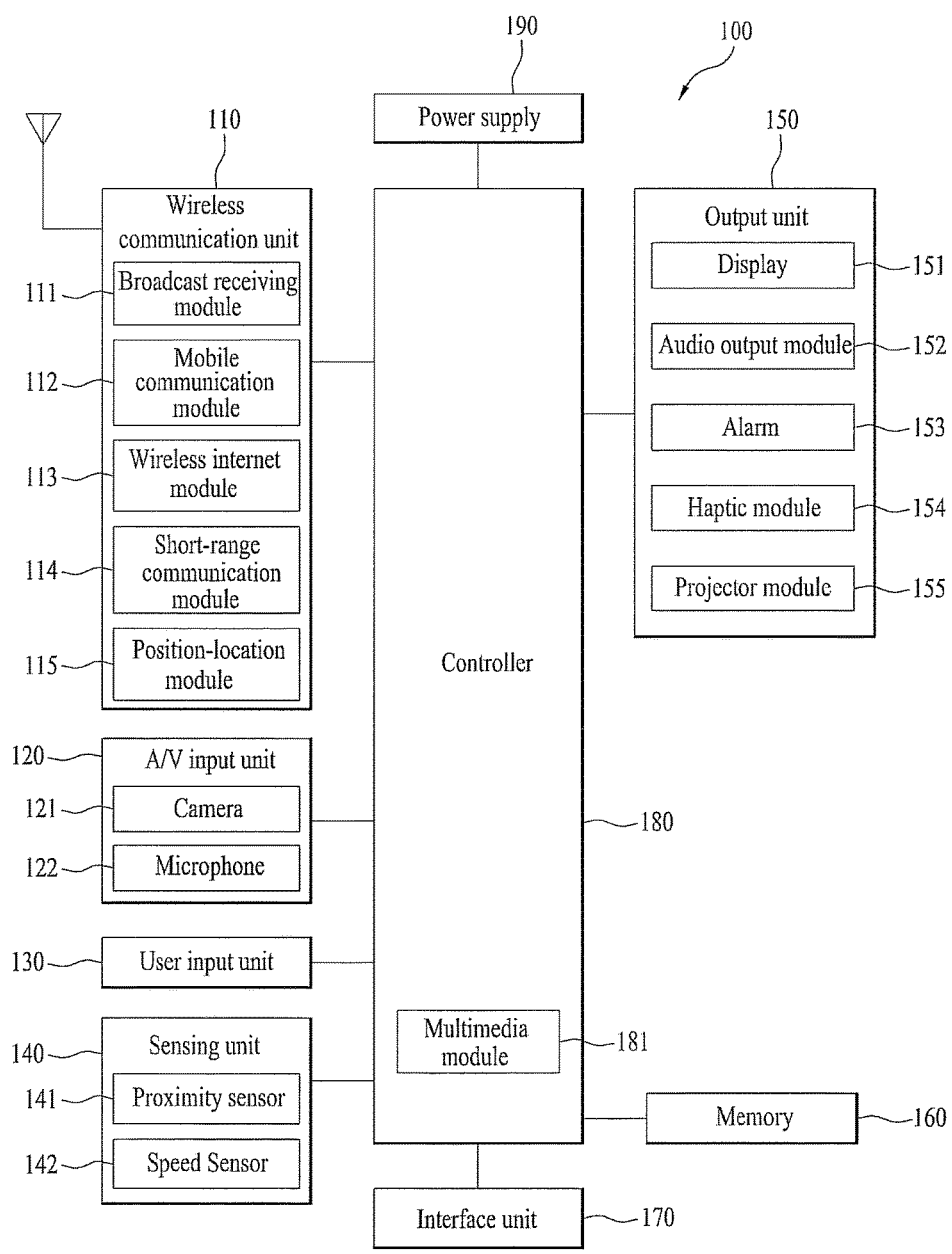

FIG. 5
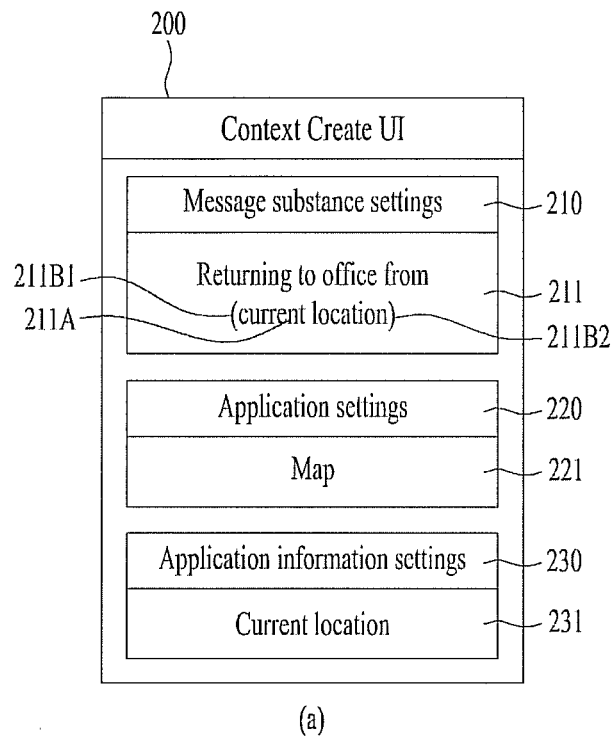
(a)
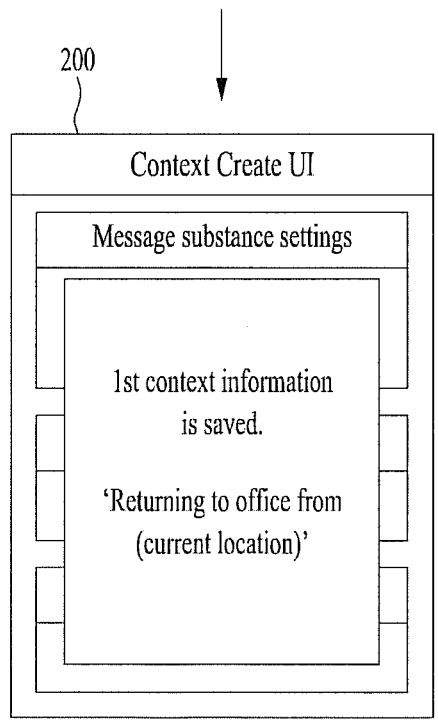
(b)

FIG. 8
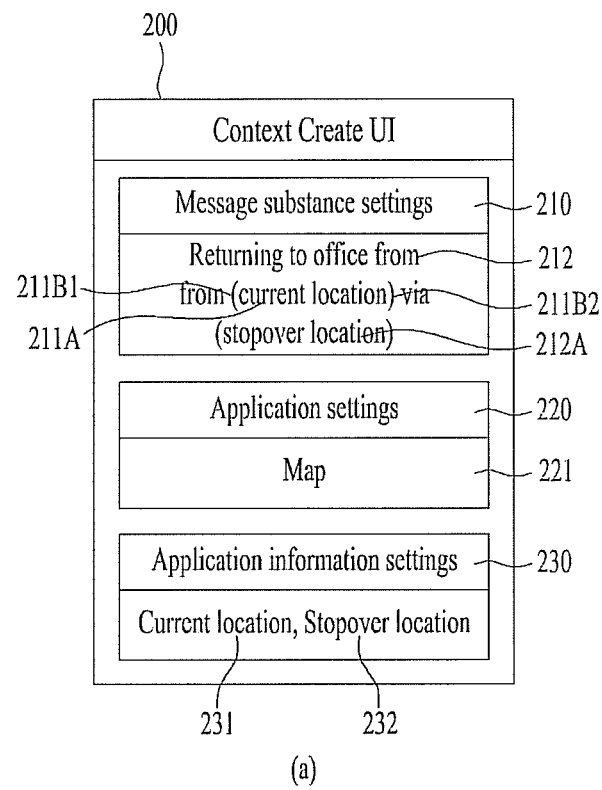
(a)
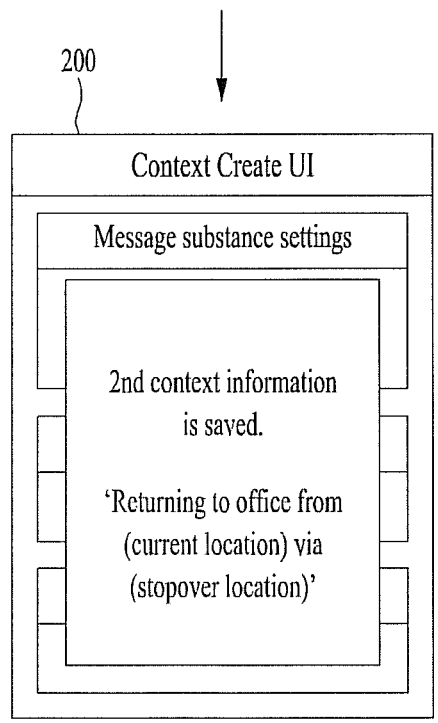
(b)

FIG. 11
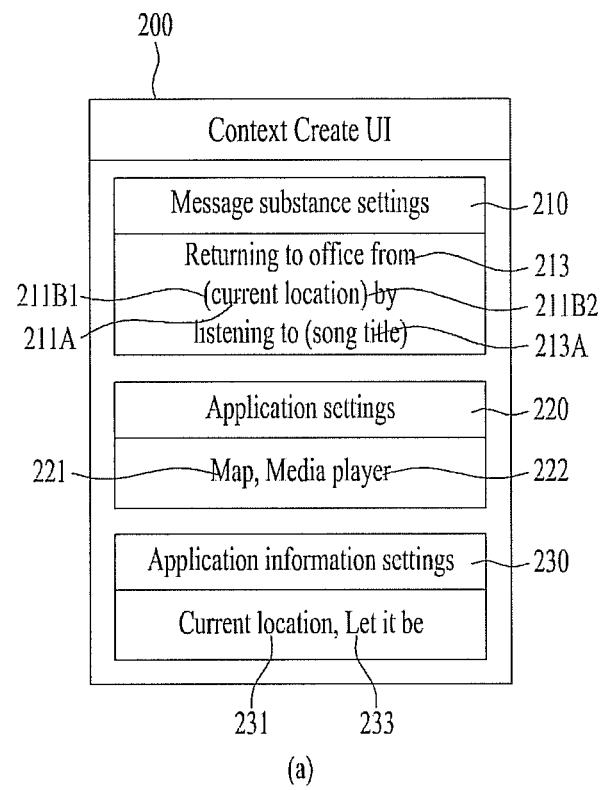
(a)
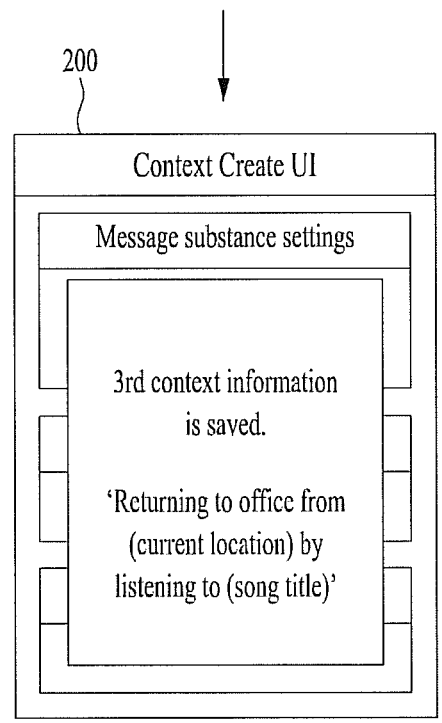
(b)

FIG. 14
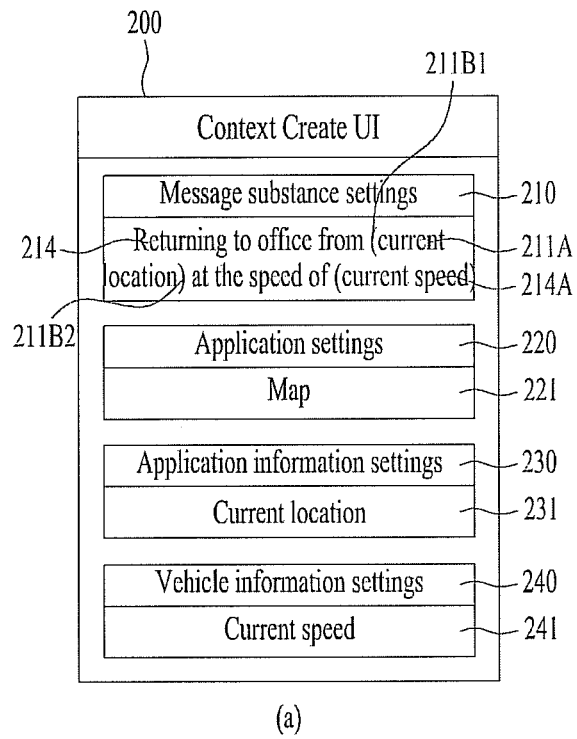
(a)
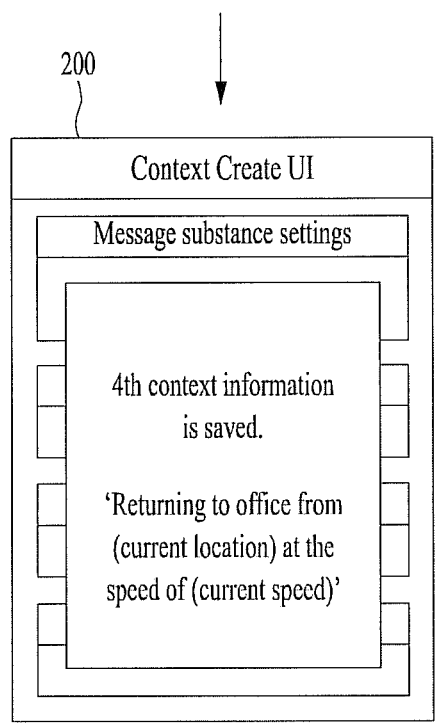
(b)

TERMINAL FOR CREATING AND TRANSMITTING A MESSAGE AND CONTROLLING METHOD THEREOF

Pursuant to 35 U.S.C. §119(e), this application claims the benefit of U.S. Provisional Application No. 61/663,619, filed on Jun. 24, 2012, and Pursuant to 35 U.S.C. §119(a) the benefit of Korean Application No. 10-2013-0057066 filed on May 21, 2013, which are hereby incorporated by reference herein in their entirety.

BACKGROUND OF THE INVENTION

Field of the Invention

The present invention relates to a terminal, and more particularly, to a terminal and a method of controlling the terminal.

Discussion of the Related Art

A mobile terminal is a device that can be configured to perform various functions, such as data and voice communications, capturing still images and video via a camera, recording audio, playing music files and outputting music via a speaker system, and displaying images and video on a display. Some terminals include additional functionality to support game playing, while other terminals are also configured as multimedia players. More recently, mobile terminals have been configured to receive broadcast and multicast signals to permit viewing of content, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, a vehicle terminal mounted on a vehicle provides various functions supportable by a smartphone as well as information related to the driving of the vehicle. In this case, the functions supportable by the smartphone include a navigation (route guide) function, a media play function, a call function, a message sending function, an internet function, various application functions and the like.

However, an act of inputting a text for writing a message by manipulating a vehicle terminal while driving a vehicle is a very dangerous act that is prohibited by laws in many countries.

SUMMARY OF THE INVENTION

Accordingly, embodiments of the present invention are directed to a terminal and controlling method thereof that substantially obviate one or more problems due to limitations and disadvantages of the related art.

One object of the present invention is to provide a terminal and controlling method thereof, by which a message including information provided by at least one application can be sent by a single manipulation of a driver in the course of driving a vehicle in a manner of being automatically created to fit a predetermined format.

Another object of the present invention is to provide a terminal and controlling method thereof, by which a message including a content of combining information provided by at least two applications can be sent by a single manipulation of a driver in the course of driving a vehicle in a manner of being automatically created to fit a predetermined format.

A further object of the present invention is to provide a terminal and controlling method thereof, by which a message including a content of combining an information provided by at least one application and at least one vehicle information together can be sent by a single manipulation of a driver in the course of driving a vehicle in a manner of being automatically created to fit a predetermined format.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a terminal, which is provided to a vehicle, according to one embodiment of the present invention includes a communication unit, a display unit, a memory provided with at least one application, and a controller, when a message transmission command is inputted in the course of driving the vehicle, creating a message including at least one information provided by the at least one application and then transmitting the created message via the communication unit.

In another aspect of the present invention, a method of controlling a terminal, which is provided to a vehicle, according to another embodiment of the present invention includes the steps of detecting whether a message transmission command is inputted in the course of driving the vehicle, when the message send command is inputted, creating a message including at least one information provided by at least one application provided to the terminal, and transmitting the created message.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 1 illustrates a block diagram of a mobile terminal in accordance with one embodiment of the present invention;

FIG. 4 and FIG. 5 are diagrams for examples of a process for creating a context information on setting an inclusive condition of information to be included in a content of a message to be sent in the course of driving a vehicle according to a $1^{st}$ embodiment of the present invention;

FIG. 7 and FIG. 8 are diagrams for examples of a process for creating a context information indicating an inclusive condition of information to be included in a content of a message to be sent in the course of driving a vehicle according to a $2^{nd}$ embodiment of the present invention;

FIG. 10 and FIG. 11 are diagrams for examples of a process for creating a context information indicating an inclusive condition of information to be included in a content of a message to be sent in the course of driving a vehicle according to a $3^{rd}$ embodiment of the present invention;

FIG. 13 and FIG. 14 are diagrams for examples of a process for creating a context information indicating an inclusive condition of information to be included in a content of a message to be sent in the course of driving a vehicle according to a $4^{th}$ embodiment of the present invention;

DETAILED DESCRIPTION OF THE INVENTION

Figure 2A:
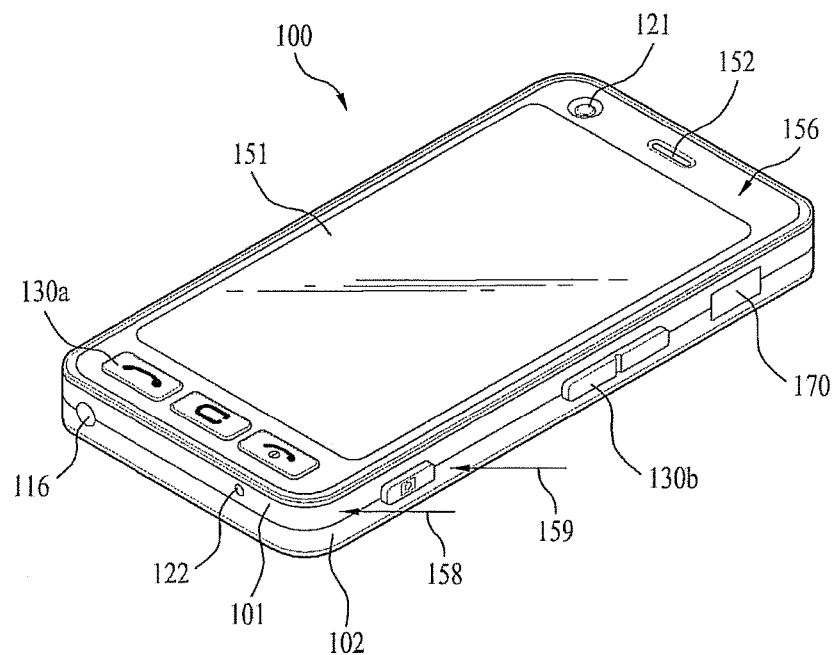
FIG. 2A is a front perspective view of the mobile terminal in accordance with one embodiment of the present invention.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The terms "module," "unit," and "part" are used herein with respect to various elements only to facilitate disclosure of the invention. Therefore, the terms "module," "unit," and "part" are used interchangeably herein.

The terminal 100 described in the present specification may be provided as a vehicle head unit installed inside a vehicle. And, the terminal 100 is connected to sensors provided to various parts of the vehicle, measures various kinds of vehicle information (e.g., a current speed, a current gas mileage, a total driving distance, a drivable distance, a remaining gas level, a tire air pressure, a GPS location information, a navigation information, etc.) related to a driving of the vehicle, and can provide a user with information indicating the measured vehicle states. In this case, the vehicle head unit may become a device including at least one of a media play device installed on the vehicle, an instrument panel indicating various states of the vehicle, a navigation system providing a route guide function, a media play function and a communication function, and a control device for controlling operations of the vehicle.

The terminal 100 described in the present specification may include such a mobile terminal connected by wire/wireless to the vehicle head unit as a mobile phone, a smart phone, a laptop computer, a digital broadcast terminal, a PDA (personal digital assistants), a PMP (portable multimedia player, a navigation system and the like. In this case, while a vehicle is moving, the terminal 100 can receive various vehicle information (e.g., a current speed, a current gas mileage, a total driving distance, a drivable distance, a remaining gas level, a tire air pressure, a GPS location information, a navigation information, etc.) related to the driving of the vehicle from the vehicle head unit.

In the following description, assume that the terminal 100 according to the present invention includes such a mobile terminal connected by wire/wireless to the vehicle head unit as a mobile phone, a smart phone, a laptop computer, a digital broadcast terminal, a PDA (personal digital assistants), a PMP (portable multimedia player, a navigation system and the like. Moreover, it is apparent to those skilled in the art, to which the present invention pertains, that the configuration of the terminal 100 according to the present invention is identically applicable to the vehicle head unit.

FIG. 1 illustrates an exemplary block diagram of the mobile terminal 100 in accordance with one embodiment of the present invention. It should be understood that embodiments, configurations and arrangements other than that depicted in FIG. 1 can be used without departing from the spirit and scope of the invention. As shown in FIG. 1, the mobile terminal 100 includes a wireless communication unit 110, an audio/video (AV) input unit 120, a user input unit 130, a sensing unit 140, an output unit 150, a memory 160, an interface unit 170, a controller 180, and a power supply unit 190. It should be understood that the mobile terminal 100 may include additional or fewer components than those shown in FIG. 1.

The wireless communication unit 110 can include one or more components for allowing wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

Moreover, as mentioned in the foregoing description, if the terminal 100 according to the present invention includes a mobile terminal instead of the vehicle head unit, the communication unit 110 connects a communication with a head unit of a vehicle and is able to receive various vehicle information (e.g., a current speed, a current gas mileage, a total driving distance, a drivable distance, a remaining gas level, a tire air pressure, a GPS location information, a navigation information, etc.) related to the driving of the vehicle from the head unit of the vehicle.

The broadcast receiving module 111 receives a broadcast signal and/or broadcast related information from an external broadcast management server via a broadcast channel. In one embodiment, the mobile terminal 100 can be configured to include two or more broadcast receiving modules 111 to enable simultaneous reception of two or more broadcast channels or to facilitate switching of broadcast channels.

The broadcast channel can include a satellite channel and a terrestrial channel. The broadcast management server can be a server that generates and transmits a broadcast signal and/or broadcast related information, or a server that receives a previously-generated broadcasting signal and/or previously-generated broadcasting-related information and transmits the previously-generated broadcast signal and/or previously-generated broadcasting-related information to the mobile terminal 100.

For example, the broadcast signal can be implemented as a TV broadcast signal, a radio broadcast signal, a data broadcast signal, and various other types of signals. In one embodiment, the broadcast signal can include a combination of the broadcast signal and a TV broadcast signal or a combination of the broadcast signal and a radio broadcast signal.

The broadcast-related information can include broadcast channel information, broadcast program information, or broadcast service provider information. The broadcast-related information can be provided to the mobile terminal 100 through a mobile communication network. In such a case, the broadcast-related information can be received by the mobile communication module 112.

The broadcast-related information can be implemented in various forms. For example, the broadcast-related information can have the form of an electronic program guide (EPG) of the digital multimedia broadcasting (DMB) standard, or an electronic service guide (ESG) of the digital video broadcast-handheld (DVB-H) standard.

The broadcast receiving module 111 can be configured to receive broadcast signals transmitted from various types of broadcast systems, such as digital multimedia broadcasting-terrestrial (DMB-T), digital multimedia broadcasting-satellite (DMB-S), DVB-H, digital video broadcast-Convergence of Broadcast and Mobile Services (DVB-CBMS), Open Mobile Alliance BroadCAST (OMA-BCAST), the data broadcasting system known as media forward link only (MediaFLO) and integrated services digital broadcast-terrestrial (ISDB-T) systems. The broadcast receiving module 111 can be configured to receive signals from broadcasting systems providing broadcasting signals other than the above-described digital broadcasting systems. The broadcast signal and/or broadcast-related information received via the broadcast receiving module 111 can be stored in a storage medium, such as the memory 160.

The mobile communication module 112 can transmit and/or receive wireless signals to and/or from at least one network entity, such as a base station, an external terminal, or a server. For example, such wireless signals can include audio, video, and data according to a transmission and reception of text/multimedia messages.

Moreover, as mentioned in the foregoing description, if the terminal 100 according to the present invention includes a mobile terminal instead of the vehicle head unit, the wireless internet module 113 connects a communication with a head unit of a vehicle and is able to receive various vehicle information (e.g., a current speed, a current gas mileage, a total driving distance, a drivable distance, a remaining gas level, a tire air pressure, a GPS location information, a navigation information, etc.) related to the driving of the vehicle from the head unit of the vehicle.

The wireless Internet module 113 can be a module that supports Internet access for the mobile terminal 100. For example, the wireless Internet module 113 can be included in the mobile terminal 100 or installed in an external device that is coupled to the mobile terminal 100. For example, the wireless Internet technology implemented by the wireless Internet module 113 can be a wireless local area network (WLAN), Wi-Fi, Wireless Broadband (WiBro), World Interoperability for Microwave Access (WiMAX), or High Speed Downlink Packet Access (HSDPA).

Moreover, as mentioned in the foregoing description, the wireless internet module 113 can receive or download the data relevant to the area, in which the mobile terminal 100 is located, from the external server.

Moreover, as mentioned in the foregoing description, if the terminal 100 according to the present invention includes a mobile terminal instead of the vehicle head unit, the short range communication module 114 connects a communication with a head unit of a vehicle and is able to receive various vehicle information (e.g., a current speed, a current gas mileage, a total driving distance, a drivable distance, a remaining gas level, a tire air pressure, a GPS location information, a navigation information, etc.) related to the driving of the vehicle from the head unit of the vehicle.

The short-range communication module 114 can be a module for supporting relatively short-range communications. For example, the short-range communication module 114 can be configured to communicate using short range communication technology, such as, radio frequency identification (RFID), Infrared Data Association (IrDA), or Ultra-wideband (UWB), as well as networking technologies, such as Bluetooth™, ZigBee or Digital Living Network Alliance (DLNA).

Moreover, as mentioned in the foregoing description, if the terminal 100 according to the present invention includes a mobile terminal instead of the vehicle head unit, the short range communication module 114 establishes a short range communication with the head unit of the vehicle and is able to receive various vehicle information (e.g., a current speed, a current gas mileage, a total driving distance, a drivable distance, a remaining gas level, a tire air pressure, a GPS location information, a navigation information, etc.) related to the driving of the vehicle from the head unit of the vehicle.

The position-location module 115 identifies or otherwise obtains the location of the mobile terminal 100. In one embodiment, the position-location module 115 can include a global positioning system (GPS) module.

The A/V input unit 120 can be used to input an audio signal or a video signal, and can include a camera 121 and a microphone 122. For example, the camera 121 can have a digital zoom feature and can process image frames of still images or video obtained by an image sensor of the camera 121 in a video call mode or a photographing mode. The processed image frames can be displayed on a display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 can receive an external audio signal while operating in a particular mode, such as a phone call mode, a recording mode or a voice recognition mode, and can process the received audio signal into electrical audio data. The audio data can then be converted into a form that can be transmitted to a mobile communication base station through the mobile communication module 112 in the call mode. The microphone 122 can apply various noise removal or noise canceling algorithms for removing or reducing noise generated when the external audio signal is received.

The user input unit 130 can generate input data in response to user manipulation of a corresponding input device or devices, such as a keypad, a dome switch, a touchpad, a jog wheel, or a jog switch. In one embodiment, the touchpad can be configured as a static pressure or capacitance type.

The sensing unit 140 can sense a change of position of the mobile terminal 100 or a component of the mobile terminal 100, relative positioning of components of the mobile terminal 100, such as a display and keypad, whether a user touches the mobile terminal 100, an orientation of the mobile terminal 100, acceleration or deceleration of the mobile terminal 100, and a current state of the mobile terminal 100, such as an open or close state. Meanwhile, the sensing unit 140 may include a proximity sensor 141 and a speed sensor 142. The proximity sensor 141 shall be described later in association with the touchscreen. While the vehicle in which the mobile terminal 100 is located is moving, the speed sensor 141 measures a speed of the mobile terminal 100 and then outputs the measured speed to the controller 180.

The sensing unit 140 can generate a sensing signal for controlling the operation of the mobile terminal 100 according to a detected status of the mobile terminal. For example, when the mobile terminal 100 is implemented as a slide type phone, the sensing unit 140 can sense whether the mobile terminal 100 is opened or closed. Further, the sensing unit 140 can sense whether the power supply 190 supplies power and whether the interface unit 170 is connected to an external device.

The output unit 150 can generate visual, auditory and/or tactile outputs and can include the display unit 151, an audio output module 152, an alarm unit 153, a haptic module 154, and a projector module 155. The display unit 151 can be configured to display information processed by the mobile terminal 100.

For example, when the mobile terminal 100 is in a call mode, the display unit 151 can display a user interface (UI) or a graphic user interface (GUI) for placing, conducting, and terminating a call. For example, when the mobile terminal 100 is in the video call mode or the photographing mode, the display unit 151 can additionally or alternatively display images which are associated with such modes, the UI or the GUI.

The display unit 151 can be implemented using display technologies including, for example, a liquid crystal display (LCD), a thin film transistor-liquid crystal display (TFT-LCD), an organic light-emitting diode display (OLED), a flexible display and a three-dimensional display. The mobile terminal 100 can be configured to include more than one display unit 151 according to the configuration of the mobile terminal 100.

For example, the mobile terminal 100 can include a number of display units 151 that are arranged on a single face of the mobile terminal 100, and can be spaced apart from one another or integrated in one body. The number of display units 151 can also be arranged on different sides of the mobile terminal 100.

In one embodiment, the display used in the display unit 151 can be of a transparent type or a light transmittive type, such that the display unit 151 is implemented as a transparent display. For example, the transparent display can include a transparent OLED (TOLED) display. The rear structure of the display unit 151 can also be of a light transmittive type. Accordingly, a user may see an object located behind the body of the mobile terminal 100 through the transparent area of the body of the mobile terminal 100 that is occupied by the display unit 151.

When the display unit 151 and a sensor for sensing a user touch (hereinafter referred to as a "touch sensor") are configured as a layered structure to form a touch screen, the display unit 151 can be used as an input device in addition to an output device. For example, the touch sensor can be in the form of a touch film, a touch sheet, or a touch pad.

The touch sensor can convert a variation in pressure applied to a specific portion of the display unit 151 or a variation in capacitance generated at a specific portion of the display unit 151 into an electric input signal. The touch sensor can sense pressure resulting from a touch, as well as the position and area of the touch.

When the user applies a touch input to the touch sensor, a signal corresponding to the touch input can be transmitted to a touch controller (not shown). The touch controller can process the signal and transmit data corresponding to the processed signal to the controller 180. The controller 180 can then use the data to detect a touched portion of the display unit 151.

The proximity sensor 141 of the sensing unit 140 can be located in an internal region of the mobile terminal 100 and either enclosed by the touch screen or around the touch screen. The proximity sensor 141 can sense an object approaching a prescribed detecting surface or an object located near the proximity sensor 141 without any physical contact using an electromagnetic field or infrared rays. The longevity of the proximity sensor 141 can substantially exceed the longevity of a contact sensor and, therefore, can have wide applications in the mobile terminal 100.

The proximity sensor 141 can include a transmittive photo-electric sensor, a direct reflection photo-electric sensor, a mirror reflection photo-electric sensor, a radio frequency oscillation proximity sensor, an electrostatic capacity proximity sensor, a magnetic proximity sensor, and/or an infrared proximity sensor. In one embodiment, the touch screen can include an electrostatic capacity proximity sensor, such that a proximity of a pointer can be detected through a variation in an electric field according to the proximity of the pointer. Accordingly, the touch screen or touch sensor can be classified as the proximity sensor 141.

For purposes of clarity, an action of the pointer approaching the touch screen and being recognized without actually contacting the touch screen will be herein referred to as a "proximity touch," while an action of bringing the pointer into contact with the touch screen will be herein referred to as a "contact touch." A proximity touch position of the pointer on the touch screen can correspond to a position on the touch screen from which the pointer is situated perpendicularly with respect to the touch screen.

Via the proximity sensor 141, a proximity touch and a proximity touch pattern, such as a proximity touch distance, a proximity touch duration, a proximity touch position, or a proximity touch movement state can be detected. For example, information corresponding to the detected proximity touch action and proximity touch pattern can be displayed on the touch screen.

The audio output module 152 can output audio data received from the wireless communication unit 110, or stored in the memory 160, in a call receiving mode, a call placing mode, a recording mode, a voice recognition mode, or a broadcast receiving mode. The audio output module 152 can also provide audio signals related to particular functions performed by the mobile terminal 100, such as a call received or a message received. For example, the audio output module 152 can include a speaker, a buzzer, or other audio output device.

The alarm unit 153 can output a signal for indicating the occurrence of an event of the mobile terminal 100, such as a call received event, a message received event and a touch input received event, using a vibration as well as video or audio signals. The video or audio signals can also be output via the display unit 151 or the audio output module 152. Therefore, in various embodiments, the display unit 151 or the audio output module 152 can be considered as a part of the alarm unit 153.

The haptic module 154 can generate various tactile effects that can be physically sensed by the user. For example, a tactile effect generated by the haptic module 154 can include vibration. The intensity and/or pattern of the vibration generated by the haptic module 154 can be controlled. For example, different vibrations can be combined and provided or sequentially provided.

The haptic module 154 can generate a variety of tactile effects in addition to a vibration. Such tactile effects include an effect caused by an arrangement of vertically moving pins that are in contact with the skin of the user; an effect caused by a force of air passing through an injection hole or a suction of air through a suction hole; an effect caused by skimming over the user's skin; an effect caused by contact with an electrode; an effect caused by an electrostatic force; and an effect caused by the application of cold and warm temperatures using an endothermic or exothermic device.

For example, the haptic module 154 can enable a user to sense the tactile effects through a muscle sense of the user's finger or arm, as well as to transfer the tactile effect through direct contact. Optionally, the mobile terminal 100 can include at least two haptic modules 154 according to the configuration of the mobile terminal 100.

The projector module 155 is an element for performing an image projection function of the mobile terminal 100. In one embodiment, the projector module 155 can be configured to display an image identical to or partially different from an image displayed by the display unit 151 on an external screen or wall according to a control signal of the controller 180.

For example, the projector module 155 can include a light source (not shown), such as a laser, that generates adequate light for external projection of an image, means for producing the image (not shown) to be projected via the light generated from the light source, and a lens (not shown) for enlarging the projected image according to a predetermined focus distance. The projector module 155 can further include a device (not shown) for adjusting the direction in which the image is projected by mechanically moving the lens or the entire projector module 155.

The projector module 155 can be classified as a cathode ray tube (CRT) module, a liquid crystal display (LCD) module, or a digital light processing (DLP) module according to a type of display used. For example, the DLP module operates by enabling the light generated from the light source to reflect on a digital micro-mirror device (DMD) chip and can advantageously reduce the size of the projector module 155.

The projector module 155 can preferably be configured in a lengthwise direction along a side, front or back of the mobile terminal 100. It should be understood, however, that the projector module 155 can be configured on any portion of the mobile terminal 100.

The memory 160 can store various types of data to support the processing, control, and storage requirements of the mobile terminal 100. For example, such types of data can include program instructions for applications operated by the mobile terminal 100, contact data, phone book data, messages, audio, still images, and/or moving images.

A recent use history or a cumulative usage frequency of each type of data can be stored in the memory unit 160, such as usage frequency of each phonebook, message or multimedia. Moreover, data for various patterns of vibration and/or sound output when a touch input is performed on the touch screen can be stored in the memory unit 160.

The memory 160 can be implemented using any type or combination of suitable volatile and non-volatile memory or storage devices, such as a flash memory, a hard disk type memory, a multimedia card micro type memory, a card type memory, such as a Secure Digital (SD) card or Extreme Digital (xD) card, a random access memory (RAM), a static random access memory (SRAM), a read-only memory (ROM), an erasable programmable read-only memory (EPROM), a programmable ROM (PROM), an electrically erasable programmable read-only memory (EEPROM), a magnetic memory, a magnetic disk, an optical disk, or other type of memory or data storage device. In other embodiments, the memory 160 can be a storage device that can be accessed by the mobile terminal 100 via the Internet.

The interface unit 170 can couple the mobile terminal 100 to external devices. The interface unit 170 can receive data from the external devices or power, and transmit the data or power to internal components of the mobile terminal 100. In addition, the interface unit 170 can transmit data of the mobile terminal 100 to the external devices. The interface unit 170 can include, for example, a wired or wireless headset port, an external charger port, a wired or wireless data port, a memory card port, a port for connecting a device having an identity module, an audio input/output (I/O) port, a video I/O port, and/or an earphone port.

Moreover, as mentioned in the foregoing description, if the terminal 100 according to the present invention includes a mobile terminal instead of the vehicle head unit, the interface unit 170 can be included in the communication unit 110. In this case, the interface unit 170 is connected by wire to the head unit of the vehicle via a data cable and is able to receive various vehicle information (e.g., a current speed, a current gas mileage, a total driving distance, a drivable distance, a remaining gas level, a tire air pressure, a GPS location information, a navigation information, etc.) related to the driving of the vehicle from the head unit of the vehicle.

The identity module is the chip for storing various kinds of information for authenticating the authority to use the mobile terminal 100. For example, the identity module can be a user identify module (UIM), a subscriber identify module (SIM) or a universal subscriber identify module (USIM). A device including the identity module (hereinafter referred to as "identity device") can also be manufactured in the form of a smart card. Therefore, the identity device can be connected to the mobile terminal 100 via a corresponding port of the interface unit 170.

When the mobile terminal 100 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 can control the general operations of the mobile terminal 100. For example, the controller 180 can be configured to perform control and processing associated with voice calls, data communication, and/or video calls. The controller 180 can perform pattern recognition processing to recognize a character or image from a handwriting input or a picture-drawing input performed on the touch screen.

The power supply unit 190 can be an external power source, an internal power source, or a combination thereof. The power supply unit 190 can supply power to other components in the mobile terminal 100.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For example, the procedures or functions described herein can be implemented in software using separate software modules that allow performance of at least one function or operation. Software codes can be implemented by a software application or program written in any suitable programming language. The software codes can be stored in the memory 160 and executed by the controller 180.

FIG. 2A is a front perspective view of the mobile terminal 100 in accordance with one embodiment of the present invention. In FIG. 2A, the mobile terminal 100 is shown to have a bar type terminal body.

However, it should be understood that the mobile terminal 100 is not limited to a bar type terminal body and can have various other body types. Examples of such body types include a slide type body, folder type body, swing type body, a rotational type body, or combinations thereof. Although the disclosure herein is primarily with respect to a bar-type mobile terminal 100, it should be understood that the disclosure can be applied to other types of mobile terminals.

As shown in FIG. 2A, the case of the mobile terminal 100 (otherwise referred to as a "casing," "housing," or "cover") forming the exterior of the mobile terminal 100 can include a front case 101 and a rear case 102. Various electronic components are installed in the space between the front case 101 and the rear case 102. One or more intermediate cases can be additionally disposed between the front case 101 and the rear case 102. For example, the front case 101 and the rear case 102 can be made by injection-molding of a synthetic resin or can be made using a metal, such as stainless steel (STS) or titanium (Ti).

The display unit 151, the audio output module 152, the camera 121, user input modules 130a and 130b, the microphone 122, or the interface unit 170 can be situated on the mobile terminal 100, and specifically, on the front case 101.

As shown in FIG. 2A, for example, the display unit 151 can be configured to occupy a substantial portion of the front face 156 of the front case 101. As also shown in FIG. 2A, the audio output unit 152 and the camera 121 can be arranged in proximity to one end of the display unit 151, and the user input module 130a and the microphone 122 can be located in proximity to another end of the display unit 151. As further shown in FIG. 2A, the user input module 130b and the interface unit 170 are arranged on the sides of the front case 101 and the rear case 102, such as sides 158 and 159, respectively.

The user input unit 130 described previously with respect to FIG. 1 can be configured to receive a command for controlling an operation of the mobile terminal 100 and can include one or more user input modules 130a and 130b shown in FIG. 2A. The user input modules 130a and 130b can each be referred to as a "manipulation unit" and can be configured to employ various methods and techniques of tactile manipulation and response to facilitate operation by the user.

The user input modules 130a and 130b can be configured for inputting different commands relative to one another. For example, the user input module 130a can be configured allow a user to input such commands as "start," "end," and "scroll" to the mobile terminal 100. The user input module 130b can allow a user to input a command for adjusting the volume of the audio output unit 152 or a command for switching to a touch recognition mode of the display unit 151.

Figure 2B:
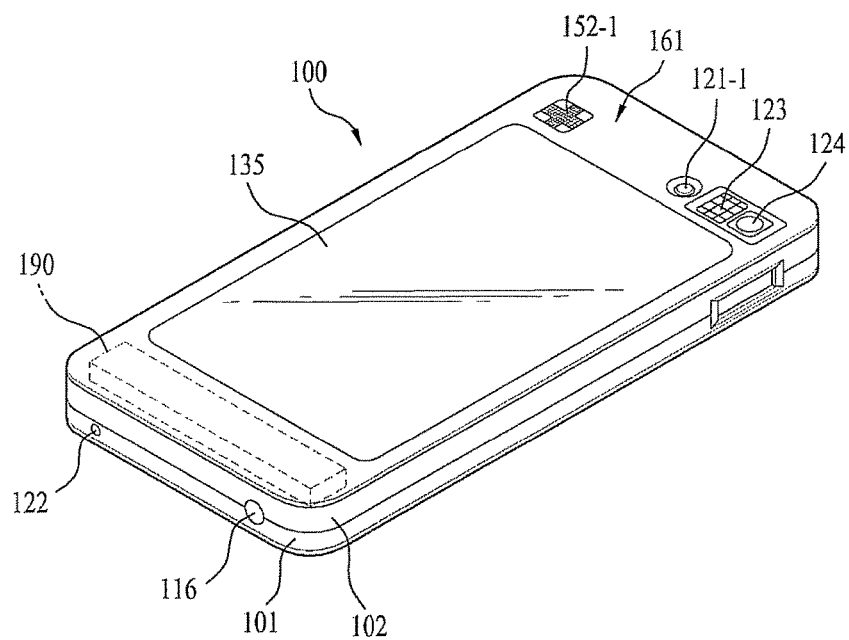
FIG. 2B is a rear perspective view of the mobile terminal in accordance with one embodiment of the present invention.

FIG. 2B is a rear perspective view of the mobile terminal 100 in accordance with one embodiment of the present invention. As shown in FIG. 2B, a camera 121-1 can be additionally located on a rear surface 161 of the rear case 102. The camera 121-1 has a direction of view that is substantially opposite to the direction of view of the camera 121 shown in FIG. 2A. The cameras 121 and 121-1 can have different resolutions, or different pixels counts, with respect to one another.

For example, the camera 121 can operate with a relatively lower resolution than the camera 121-1 in order to capture an image of the user to allow immediate transmission of the image to another user in real-time for a video call, whereas the camera 121-1 can operate with a relatively higher resolution than the camera 121 to capture images of general objects with high picture quality, which may not require immediate transmission in real-time, and may be stored for later viewing or use. For example, the cameras 121 and the camera 121-1 can be configured to rotate or to pop-up on the mobile terminal 100.

Additional camera related components, such as a flash 123 and a mirror 124, can be located adjacent to the camera 121-1. When an image of a subject is captured with the camera 121-1, the flash 123 illuminates the subject. The mirror 124 allows self-image capturing by allowing the user to see himself when the user desires to capture his own image using the camera 121-1.

The rear surface 161 of the rear case 102 can further include a second audio output module 152-1. The second audio output module 152-1 can support a stereo sound function in conjunction with the audio output module 152 shown in FIG. 2A and can be used for communication during a phone call when the mobile terminal 100 is in a speaker phone mode.

A broadcasting signal receiving antenna 116 can be additionally attached to the side of the body of the mobile terminal 100 in addition to an antenna used for telephone calls. The broadcasting signal receiving antenna 116 can form a part of the broadcast receiving module 111 shown in FIG. 1, and can be set in the body of the mobile terminal 100 such that the broadcasting signal receiving antenna can be pulled out and retracted into the body of the mobile terminal 100.

FIG. 2B shows the power supply unit 190 for providing power to the mobile terminal 100. For example, the power supply unit 190 can be situated either inside the mobile terminal 100 or detachably coupled to the mobile terminal 100.

As shown in FIG. 2B, a touch pad 135 for sensing a touch by the user can be located on the rear surface 161 of the rear case 102. In one embodiment, the touch pad 135 and the display unit 151 can be translucent such that the information displayed on display unit 151 can be output on both sides of the display unit 151 and can be viewed through the touch pad 135. The information displayed on the display unit 151 can be controlled by the touch pad 135. In another embodiment, a second display unit in addition to display unit 151 illustrated in FIG. 2A can be located on the rear surface 161 of the rear case 102 and combined with the touch pad 135 to form a touch screen on the rear case 102.

The touch pad 135 is activated by interconnecting with the display unit 151 of the front case 101. The touch pad 135 can be located in parallel with the display unit 151 and behind the display unit 151. The touch pad 135 can have the same or smaller size than the display unit 151.

In the following description, a process according to the present invention is explained in detail with reference to FIGS. 3 to 23. First of all, if a message send command is inputted in the course of driving a vehicle, a message containing a combined content of an information provided by an application of a terminal and a vehicle information is automatically created based on a context information previously determined by a user. Secondly, the created message is sent to a counterpart.

Preferably, the message may include at least one of an SMS (short message service) message, an MMS (multimedia message service) message, a message provided on a messenger and an SNS (social network service) message.

When a message is sent in the course of driving a vehicle, a process for creating a context information for defining an inclusive condition of an information, which is to be included in a content of the message scheduled to be sent is described in detail with reference to FIGS. 4 to 14 as follows.

Figure 3:
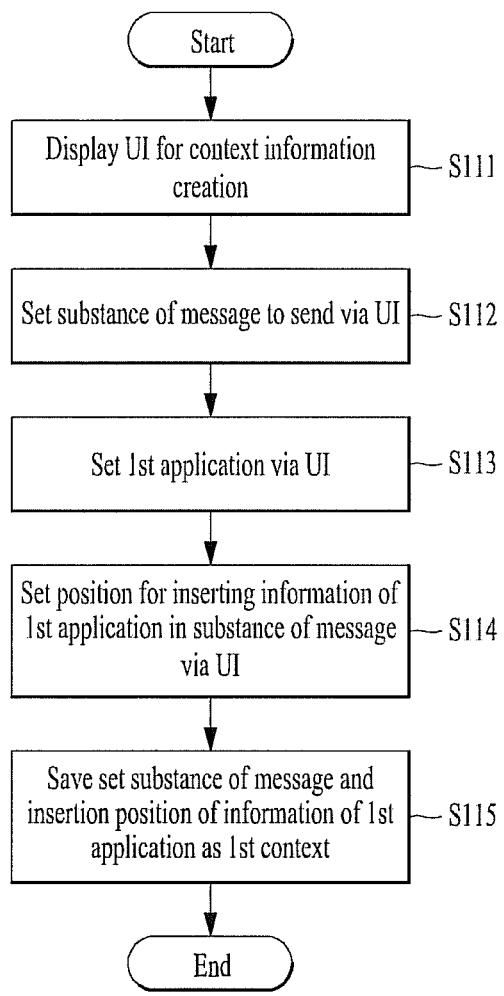
FIG. 3 is a flowchart of a process for creating a context information on setting an inclusive condition of information to be included in a content of a message to be sent in the course of driving a vehicle according to a $1^{st}$ embodiment of the present invention.

FIG. 3 is a flowchart of a process for creating a context information on setting an inclusive condition of information to be included in a content of a message to be sent in the course of driving a vehicle according to a $1^{st}$ embodiment of the present invention.

Figure 4:
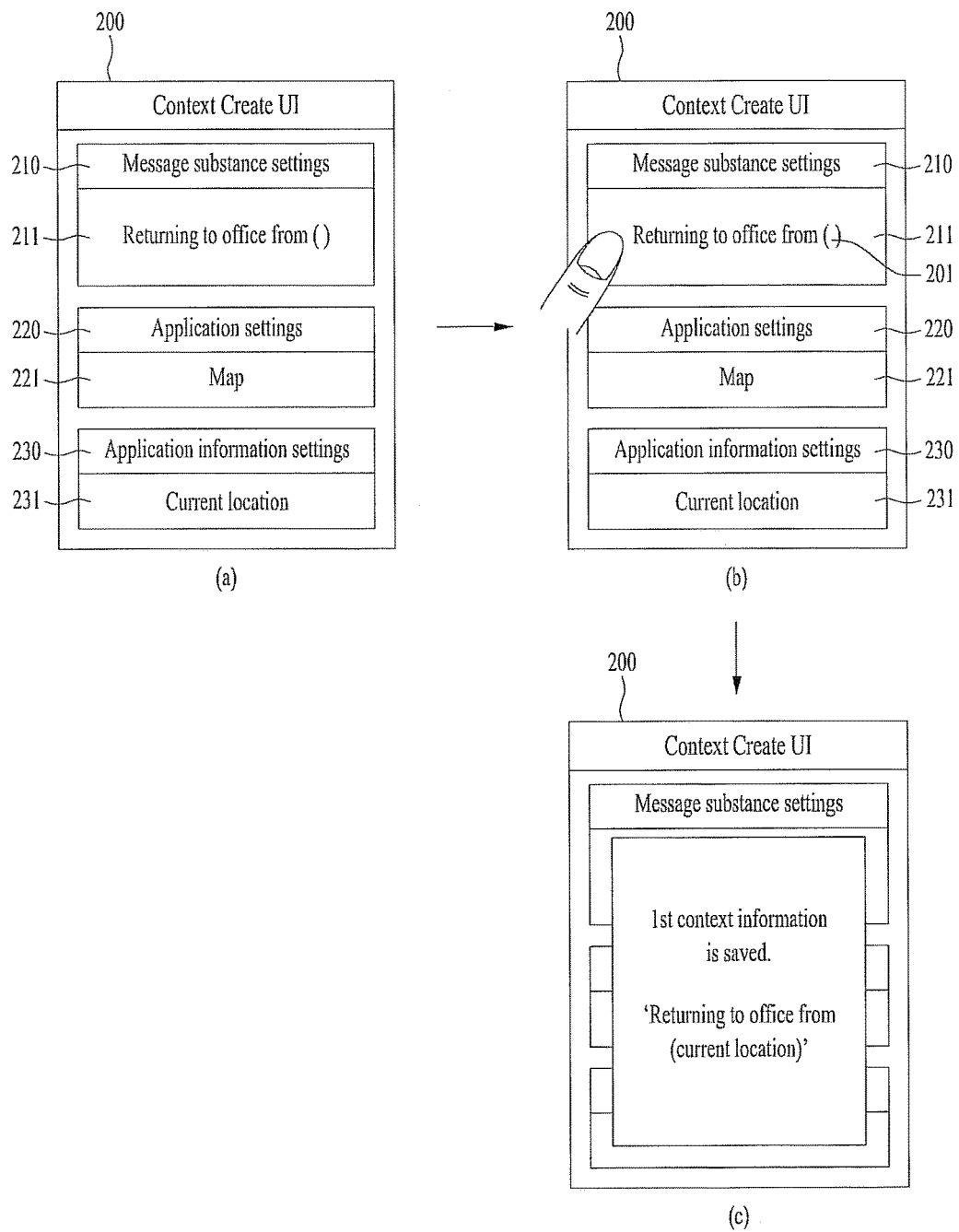

FIG. 4 and FIG. 5 are diagrams for examples of a process for creating a context information on setting an inclusive condition of information to be included in a content of a message to be sent in the course of driving a vehicle according to a $1^{st}$ embodiment of the present invention.

First of all, a $1^{st}$ context information created in FIGS. 3 to 5 indicates an inclusive condition of one information provided by one application to a content of a message to be sent in the course of driving a vehicle.

Referring to FIGS. 3 to 5, the controller 180 of the terminal 100 displays a UI (user interface) 200 for context information creation on a screen [S111].

In doing so, the UI 200 shown in FIGS. 3 to 5 includes a message content setting window 210 for a content setting of a message to be sent, an application setting window 220 for setting an application configured to provide an information to be included in a content of the message to be sent, and an application information setting window 230 for setting an information to be included in the content of the message to be sent.

In particular, if a user inputs a text or sentence corresponding to the content of the message to be sent through the message content setting window 210, the controller 180 sets the text or sentence inputted through the message content setting window 210 as the content of the message to be sent [S112]. In this case, a contact of a receiving side of the message set by the user may be included in the content of the message.

Subsequently, if the user selects a specific $1^{st}$ application, which provides an information to be included in the content of the message to be sent, through the application setting window 220, the controller 180 sets the $1^{st}$ application selected through the application setting window 220 as the application that provides the information to be included in the content of the message to be sent [S113].

Subsequently, if the user selects at least one $1^{st}$ information from information provided by the specific application and a specific position for inserting the $1^{st}$ information in the set message content through the application information setting window 230, the controller 180 sets the selected specific position in the message content as an insertion position of the $1^{st}$ information selected through the application information setting window 230 [S114].

In particular, if the application information setting window 230 is selected, the controller 180 displays an application information list of a type providable by the application and the user is then able to select an information, which will be included in the message content, from the application information list.

The controller 180 controls the information including the content of the message to be sent by the steps S112 to S114, the type of the $1^{st}$ information of the $1^{st}$ application, which is to be attached to the message content, and the insertion position of the $1^{st}$ information, to be saved as a $1^{st}$ context information in the memory 160 [S115].

For instance, referring to FIG. 4 (a), a message content 211 indicating that 'returning to office from ( )' is set in the message content setting window 210 of the UI 200 for the creation of the $1^{st}$ context information by a user. An application for providing an information to be attached into the message content 211 is set to 'Map' 221 in the application setting window 220. And, 'current location' 231 is set as a type of an information, which is to be inserted in the message content 211, in the application information setting window 230.

If a specific position 201 in a sentence of the message content 211 is designated by the user [FIG. 4 (b)], the controller controls the set message content 211, the 'current location' 231 of the application of the map 221 to be attached to the message content 211 and the insertion position of the 'current location' 231 to be saved as the $1^{st}$ context information in the memory 160 [FIG. 4 (c)].

In FIG. 4 (b), after the user has set the message content 211, the application 221 and the information 231 of the application 221 in sequence, the user sets the insertion position of the information 231 in the message content 211. Alternatively, while the message content 211 is being created, the insertion position of the information 231 is set and the application 221 and the information 231 of the application 221 can be then set.

Moreover, according to the present invention, referring to FIG. 3 and FIG. 4, the user can directly set the information 231 to insert in the message content 211 and the application 211 for providing the information 231 through the UI 200. Moreover, referring to FIG. 5, if the user inputs a text indicating a type of an information, which is to be inputted in the message content 211, to a desired position within the message content 211, the controller 180 can search applications provided to the memory 160 for an application 221 providing an information 231 of the type corresponding to the text.

In particular, FIG. 5 (a) shows that a text 211A indicating the type of the information, which is to be inserted, is included in the message content 211 inputted through the message content setting window 210.

In this case, if preset symbols (e.g., (,)) 211B1 and 211B2 are included in the message content 211, the controller 180 may recognize the text ('current location') 211A situated between the symbols 211B1 and 211B2 as the type of the information to be inserted in the message content 211.

The controller 180 searches the memory 160 for at least one application 221 that provides an information of the recognized type and then controls an insertion position of the information of the found application 221 and the message content to be saved as the $1^{st}$ context information in the memory 160 [FIG. 5 (b)].

In particular, referring to FIG. 4, the user completes the writing of the message content and is then able to directly set the insertion position of the information by touching a position, into which the information of the application will be inserted, in the message content. Alternatively, referring to FIG. 5, while the user is writing the message content, the user can set the information of the application to be inserted in the message content and the insertion position of the information.

Meanwhile, as mentioned in the foregoing description, the $1^{st}$ context information may be created through the UI 200. Alternatively, the $1^{st}$ context information is received from an external terminal via the communication unit 110 and can be then saved in the memory 160.

Moreover, the controller 180 can transmit the $1^{st}$ context information to an external terminal via the communication unit 110 in response to a user's transmit command.

Figure 6:
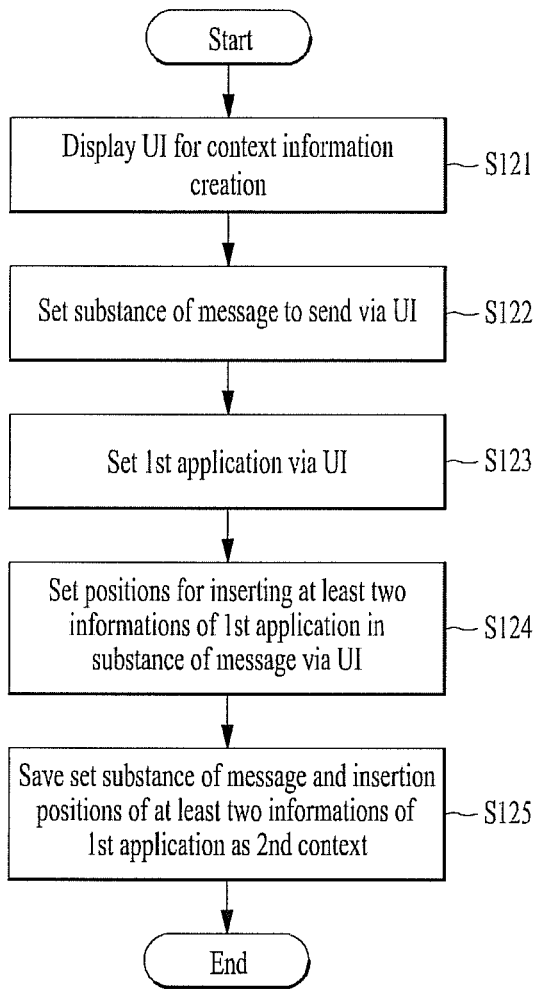
FIG. 6 is a flowchart of a process for creating a context information indicating an inclusive condition of information to be included in a content of a message to be sent in the course of driving a vehicle according to a $2^{nd}$ embodiment of the present invention.

FIG. 6 is a flowchart of a process for creating a context information indicating an inclusive condition of information to be included in a content of a message to be sent in the course of driving a vehicle according to a $2^{nd}$ embodiment of the present invention.

Figure 7:
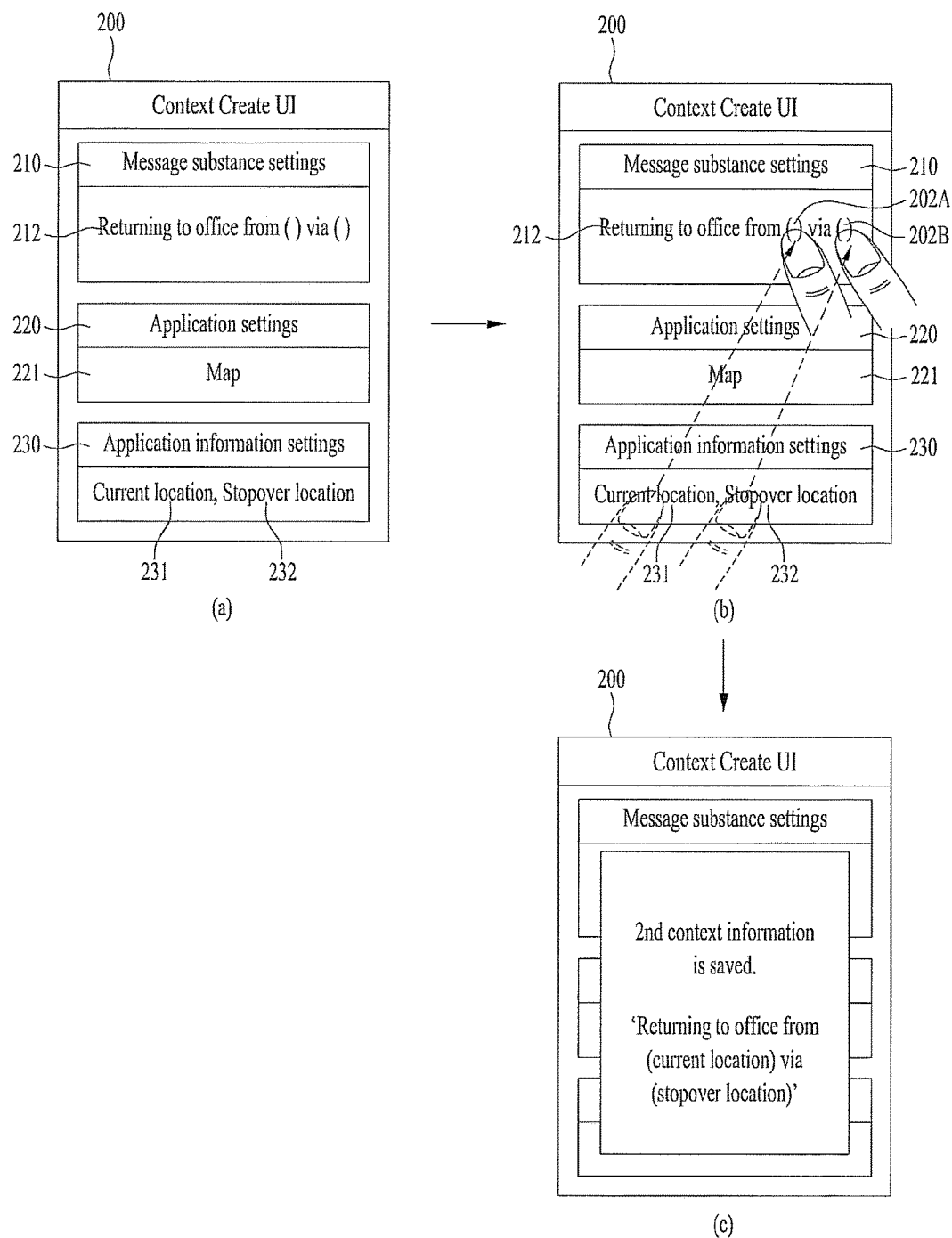

FIG. 7 and FIG. 8 are diagrams for examples of a process for creating a context information indicating an inclusive condition of information to be included in a content of a message to be sent in the course of driving a vehicle according to a $2^{nd}$ embodiment of the present invention.

First of all, a $2^{nd}$ context information created in FIGS. 6 to 8 indicates a combinable condition of at least two information provided by one application to a content of a message to be sent in the course of driving a vehicle.

Referring to FIGS. 6 to 8, the controller 180 of the terminal 100 displays a UI (user interface) 200 for context information creation on a screen [S121].

If a user inputs a text or sentence corresponding to the content of the message to be sent through a message content setting window 210 of the UI 200, the controller 180 sets the text or sentence inputted through the message content setting window 210 as the content of the message to be sent [S122]. In this case, a contact of a receiving side of the message set by the user may be included in the content of the message.

Subsequently, if the user selects a specific $1^{st}$ application, which provides an information to be included in the content of the message to be sent, through an application setting window 220, the controller 180 sets the $1^{st}$ application selected through the application setting window 220 as the application that provides the at least two information to be included in the content of the message to be sent, [S123].

Subsequently, if the user selects at least two 1st and 2nd information from information provided by the specific application and at least two 1st and 2nd positions for respectively inserting the 1st and 2nd information in the set message content through the application information setting window 230, the controller 180 sets the selected at least two 1st and 2nd positions in the message content as insertion positions of the selected at least two 1st and 2nd information selected through the application information setting window 230 [S124].

In particular, if the application information setting window 230 is selected, the controller 180 displays an application information list of a type providable by the application and the user is then able to select the 1st and 2nd information, which will be included in the message content, from the application information list.

The controller 180 controls the information including the content of the message to be sent by the steps S122 to S124, the 1st and 2nd information of the 1st application, which are to be attached to the message content, and the insertion positions of the 1st and 2nd information to be saved as a 2nd context information in the memory 160 [S125].

For instance, referring to FIG. 7 (a), a message content 212 indicating that 'returning to office from ( ) via ( )' is set in the message content setting window 210 of the UI 200 for the creation of the $2^{nd}$ context information by a user. An application for providing at least two $1^{st}$ and $2^{nd}$ information to be attached into the message content 212 is set to 'Map' 221 in the application setting window 220. And, 'current location' 231 and 'stopover location' 232 are set as types of at least two $1^{st}$ and $2^{nd}$ information, which are to be inserted in the message content 212, in the application information setting window 230.

If $1^{st}$ and $2^{nd}$ positions 202A and 202B, in which the 'current location' 231 and the 'stopover location' 232 will be inserted, in a sentence of the message content 212 are designated by the user [FIG. 7 (b)], the controller 180 controls the set message content 212, the 'current location'

231 and the 'stopover location' 232 of the application of the map 221 to be attached to the message content 212 and the insertion positions 202A and 202B of the 'current location' 231 and the 'stopover location' 232 to be saved as the $2^{nd}$ context information in the memory 160 [FIG. 7 (c)].

Meanwhile, in FIG. 7 (b), after the user has set the message content 212, the application 221 and the $1^{st}$ and $2^{nd}$ information 231 and 232 of the application 221 in sequence, the user sets the insertion positions of the $1^{st}$ and $2^{nd}$ information 231 and 232 in the message content 212. Alternatively, while the message content 212 is being written, the insertion positions of the $1^{st}$ and $2^{nd}$ information 231 and 232 are set and the application 221 and the $1^{st}$ and $2^{nd}$ information 231 and 232 of the application 221 can be then set.

Moreover, according to the present invention, referring to FIG. 6 and FIG. 7, the user can directly set the 1st and 2nd information 231 and 232 to insert in the message content 212 and the application 221 for providing the 1st and 2nd information 231 and 232 through the UI 200. Moreover, referring to FIG. 8, if the user inputs 1st and 2nd texts respectively indicating types of the 1st and 2nd information 231 and 232, which are to be inputted in the message content 212, to a desired position within the message content 212, the controller 180 can search applications provided to the memory 160 for an application 221 providing information 231 and 232 of the types respectively corresponding to the 1st and 2nd texts.

In particular, FIG. 8 (a) shows that the 1st and 2nd texts 211A and 212A respectively indicating the types of the 1st and 2nd information 231 and 232, which are to be inserted, are included in the message content 212 inputted through the message content setting window 210.

In this case, if preset symbols (e.g., (,)) 211B1 and 211B2 are included in the message content 212, the controller 180 may recognize the 1st text 'current location' 211A situated between the symbols 211B1 and 211B2 and the 2nd text 'stopover location' 212A situated between the symbols 211B1 and 211B2 as the types of the information to be inserted in the message content 212, respectively.

The controller 180 searches the memory 160 for at least one application 221 that provides information of the recognized types and then controls the insertion positions of the 1st and 2nd information 231 and 232 of the found application 221 and the message content 212 to be saved as the 2nd context information in the memory 160 [FIG. 8 (b)].

In particular, referring to FIG. 7, the user completes the writing of the message content and is then able to directly set the insertion positions of the 1st and 2nd information 231 and 232 by touching positions, into which at least two 1st and 2nd information of the application will be inserted, respectively, in the message content. Alternatively, referring to FIG. 8, while the user is writing the message content, the user can set at least two 1st and 2nd information of the application to be inserted in the message content and the insertion positions of the 1st and 2nd information 231 and 232.

Meanwhile, as mentioned in the foregoing description, the $2^{nd}$ context information may be created through the UI 200. Alternatively, the $2^{nd}$ context information is received from an external terminal via the communication unit 110 and can be then saved in the memory 160.

Moreover, the controller 180 can transmit the $2^{nd}$ context information to an external terminal via the communication unit 110 in response to a user's transmit command.

Figure 9:
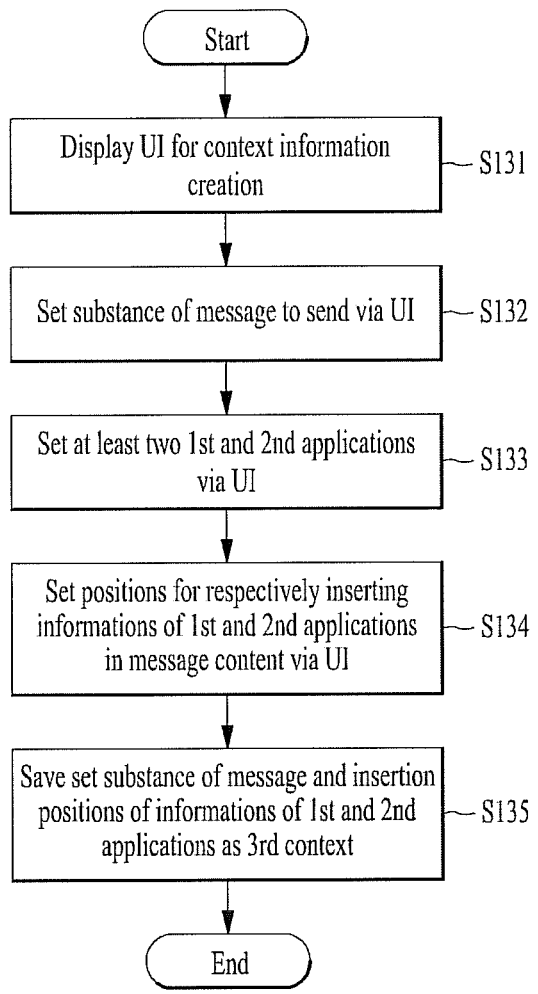
FIG. 9 is a flowchart of a process for creating a context information indicating an inclusive condition of information to be included in a content of a message to be sent in the course of driving a vehicle according to a $3^{rd}$ embodiment of the present invention.

FIG. 9 is a flowchart of a process for creating a context information indicating an inclusive condition of information to be included in a content of a message to be sent in the course of driving a vehicle according to a $3^{rd}$ embodiment of the present invention.

Figure 10:
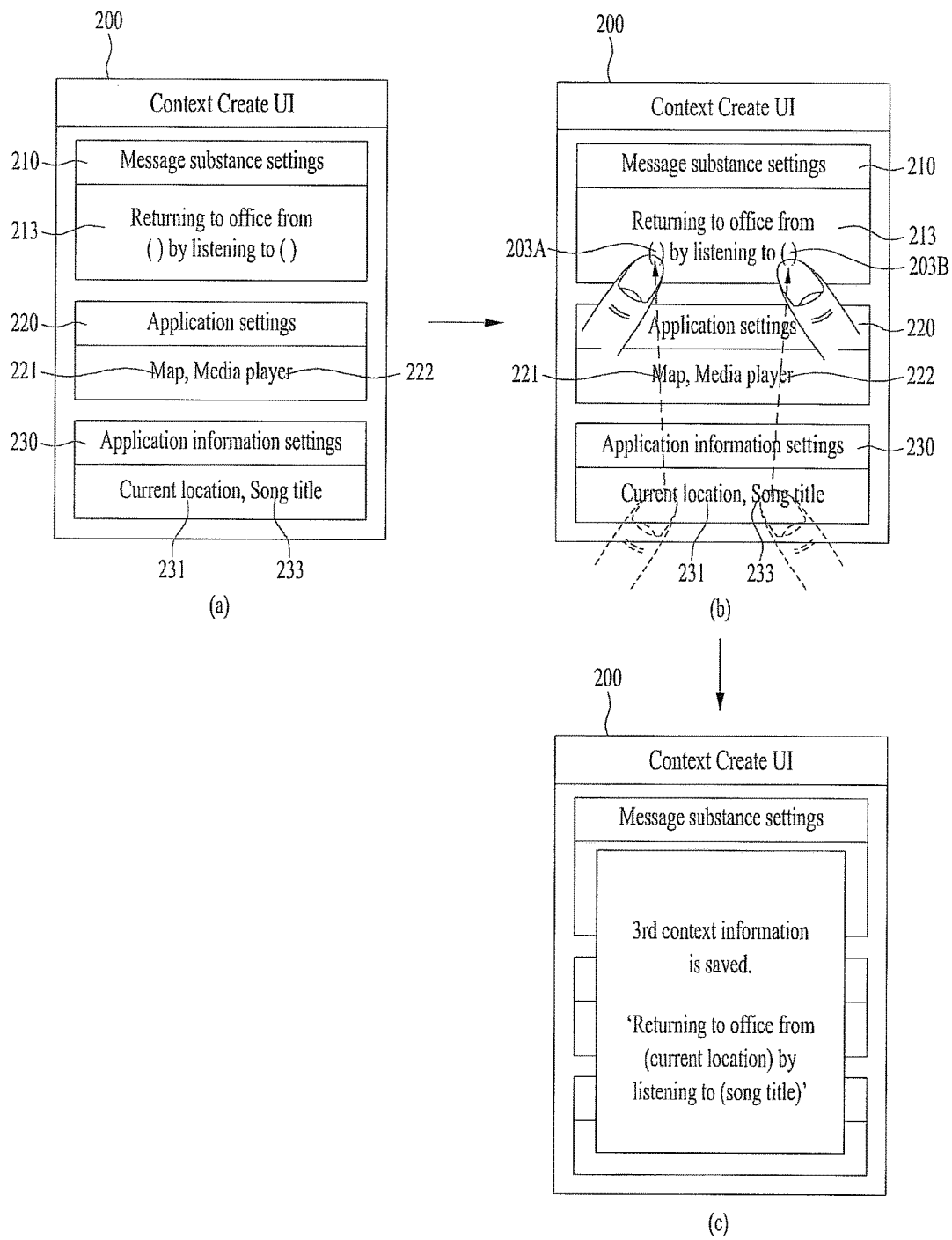

FIG. 10 and FIG. 11 are diagrams for examples of a process for creating a context information indicating an inclusive condition of information to be included in a content of a message to be sent in the course of driving a vehicle according to a $3^{rd}$ embodiment of the present invention.

First of all, a $3^{rd}$ context information created in FIGS. 9 to 11 indicates a combinable condition of information respectively provided by at least two applications to a content of a message to be sent in the course of driving a vehicle.

Referring to FIGS. 9 to 11, the controller 180 of the terminal 100 displays a UI (user interface) 200 for context information creation on a screen [S131].

If a user inputs a text or sentence corresponding to the content of the message to be sent through a message content setting window 210 of the UI 200, the controller 180 sets the text or sentence inputted through the message content setting window 210 as the content of the message to be sent [S132]. In this case, a contact of a receiving side of the message set by the user may be included in the content of the message.

Subsequently, if the user selects at least two $1^{st}$ and $2^{nd}$ applications, which provides at least $1^{st}$ and $2^{nd}$ information to be included in the content of the message to be sent, respectively, through an application setting window 220, the controller 180 sets the selected two $1^{st}$ and $2^{nd}$ applications selected through the application setting window 220 as the applications respectively providing the at least $1^{st}$ and $2^{nd}$ information to be included in the content of the message to be sent [S133].

Subsequently, if the user selects $1^{st}$ and $2^{nd}$ information respectively provided by the $1^{st}$ and $2^{nd}$ applications and $1^{st}$ and $2^{nd}$ positions for respectively inserting the $1^{st}$ and $2^{nd}$ information in the set message content through an application information setting window 230, the controller 180 sets the selected $1^{st}$ and $2^{nd}$ positions in the message content as insertion positions of the $1^{st}$ and $2^{nd}$ information selected through the application information setting window 230, respectively [S134].

In particular, if the application information setting window 230 is selected, the controller 180 displays a $1^{st}$ application information list of a type providable by the $1^{st}$ application and a $2^{nd}$ application information list of a type providable by the $2^{nd}$ application and the user is then able to select the $1^{st}$ and $2^{nd}$ information of the $1^{st}$ and $2^{nd}$ applications, which will be included in the message content, from the $1^{st}$ and $2^{nd}$ application information lists, respectively.

The controller 180 controls the information including the content of the message to be sent by the steps S132 to S134, the $1^{st}$ and $2^{nd}$ information of the $1^{st}$ and $2^{nd}$ applications, which are to be attached to the message content, and the insertion positions of the $1^{st}$ and $2^{nd}$ information to be saved as a $3^{rd}$ context information in the memory 160 [S135].

For instance, referring to FIG. 10 (a), a message content 213 indicating that 'returning to office from ( ) by listening to ( )' is set in the message content setting window 210 of the UI 200 for the creation of the $3^{rd}$ context information by a user. Applications for providing at least two $1^{st}$ and $2^{nd}$ information to be attached into the message content 213 are set to 'Map' 221 and 'Media player' 222 in the application setting window 220, respectively. And, 'current location' 231 and 'Song tide for play' 233 are set as types of the at least two $1^{st}$ and $2^{nd}$ information, which are to be inserted in the message content 213, in the application information setting window 230, respectively.

If $1^{st}$ and $2^{nd}$ positions 203A and 203B, in which the 'current location' 231 and the 'song title for play' 233 will be inserted, in a sentence of the message content 213 are designated by the user, respectively [FIG. 10 (b)], the controller 180 controls the set message content 213, the 'current location' 231 and the 'song title for play' 233 of the map 221 and the media player 222 to be attached to the message content 213 and the insertion positions 203A and 203B of the 'current location' 231 and the 'song title for paly' 233 to be saved as the $3^{rd}$ context information in the memory 160 [FIG. 10 (c)].

Meanwhile, in FIG. 10 (b), after the user has set the message content 213, the $1^{st}$ and $2^{nd}$ applications 221 and 222 and the $1^{st}$ and $2^{nd}$ information 231 and 233 of the $1^{st}$ and $2^{nd}$ applications 221 and 222 in sequence, the user sets the insertion positions of the $1^{st}$ and $2^{nd}$ information 231 and 233 in the message content 213. Alternatively, while the message content 213 is being written, the insertion positions of the $1^{st}$ and $2^{nd}$ information 231 and 233 are set and the $1^{st}$ and $2^{nd}$ applications 221 and 222 and the $1^{st}$ and $2^{nd}$ information 231 and 233 of the $1^{st}$ and $2^{nd}$ applications 221 and 222 can be then set.

Moreover, according to the present invention, referring to FIG. 9 and FIG. 10, the user can directly set the 1st and 2nd information 231 and 233 to insert in the message content 213 and the 1st and 2nd applications 221 and 222 for respectively providing the 1st and 2nd information 231 and 233 through the UI 200. Moreover, referring to FIG. 11, if the user inputs 1st and 2nd texts indicating types of the 1st and 2nd information 231 and 233, which are to be inputted in the message content 213, to desired positions within the message content 213, respectively, the controller 180 can search applications provided to the memory 160 for the 1st and 2nd application 221 and 222 providing the information 231 and 233 of the types corresponding to the 1st and 2nd texts, respectively.

In particular, FIG. 11 (a) shows that the 1st and 2nd texts 211A and 213A respectively indicating the types of the 1st and 2nd information 231 and 233, which are to be inserted, are included in the message content 213 inputted through the message content setting window 210.

In this case, if preset symbols (e.g., (,)) 211B1 and 211B2 are included in the message content 213, the controller 180 may recognize the 1st text 'current location' 211A situated between the symbols 211B1 and 211B2 and the 2nd text 'song title for play' 213A situated between the symbols 211B1 and 211B2 as the types of the information to be inserted in the message content 213, respectively.

The controller 180 searches the memory 160 for at least 1st and 2nd application 221 and 221 respectively providing information of the recognized types and then controls the insertion positions of the 1st and 2nd information 231 and 233 of the found 1st and 2nd applications 221 and 222 and the message content 213 to be saved as the 3rd context information in the memory 160 [FIG. 11 (b)].

In particular, referring to FIG. 10, the user completes the writing of the message content and is then able to directly set the insertion positions of the 1st and 2nd information by touching positions, into which the 1st and 2nd information of the 1st and 2nd applications will be inserted, respectively, in the message content. Alternatively, referring to FIG. 11, while the user is writing the message content, the user can set the 1st and 2nd information of the 1st and 2nd applications to be inserted in the message content and the insertion positions of the 1st and 2nd information together.

Meanwhile, as mentioned in the foregoing description, the $3^{rd}$ context information may be created through the UI 200. Alternatively, the $3^{nd}$ context information is received from an external terminal via the communication unit 110 and can be then saved in the memory 160.

Moreover, the controller 180 can transmit the $3^{rd}$ context information to an external terminal via the communication unit 110 in response to a user's transmit command.

Figure 12:
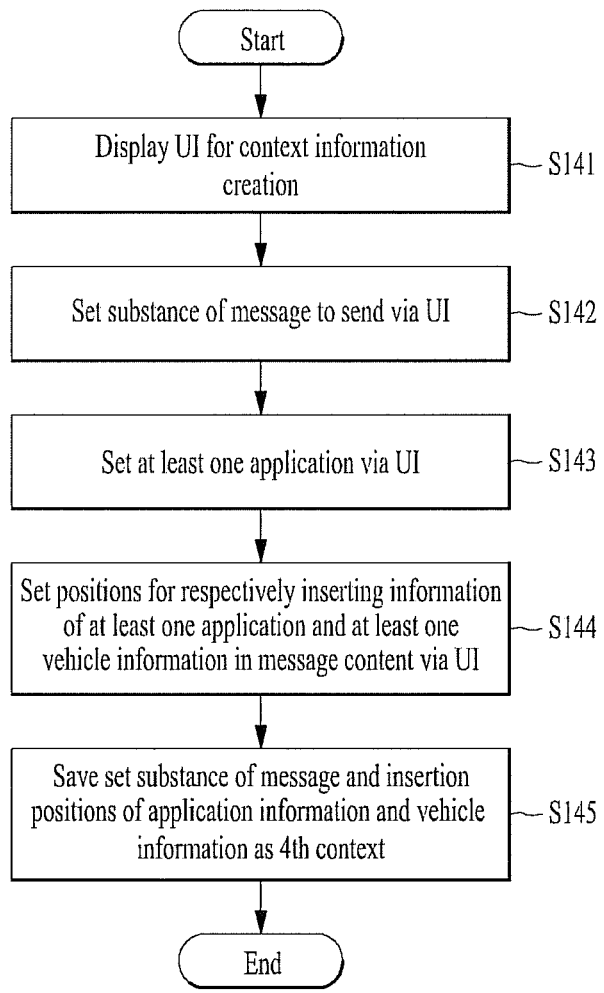
FIG. 12 is a flowchart of a process for creating a context information indicating an inclusive condition of information to be included in a content of a message to be sent in the course of driving a vehicle according to a $4^{th}$ embodiment of the present invention.

FIG. 12 is a flowchart of a process for creating a context information indicating an inclusive condition of information to be included in a content of a message to be sent in the course of driving a vehicle according to a $4^{th}$ embodiment of the present invention.

Figure 13:
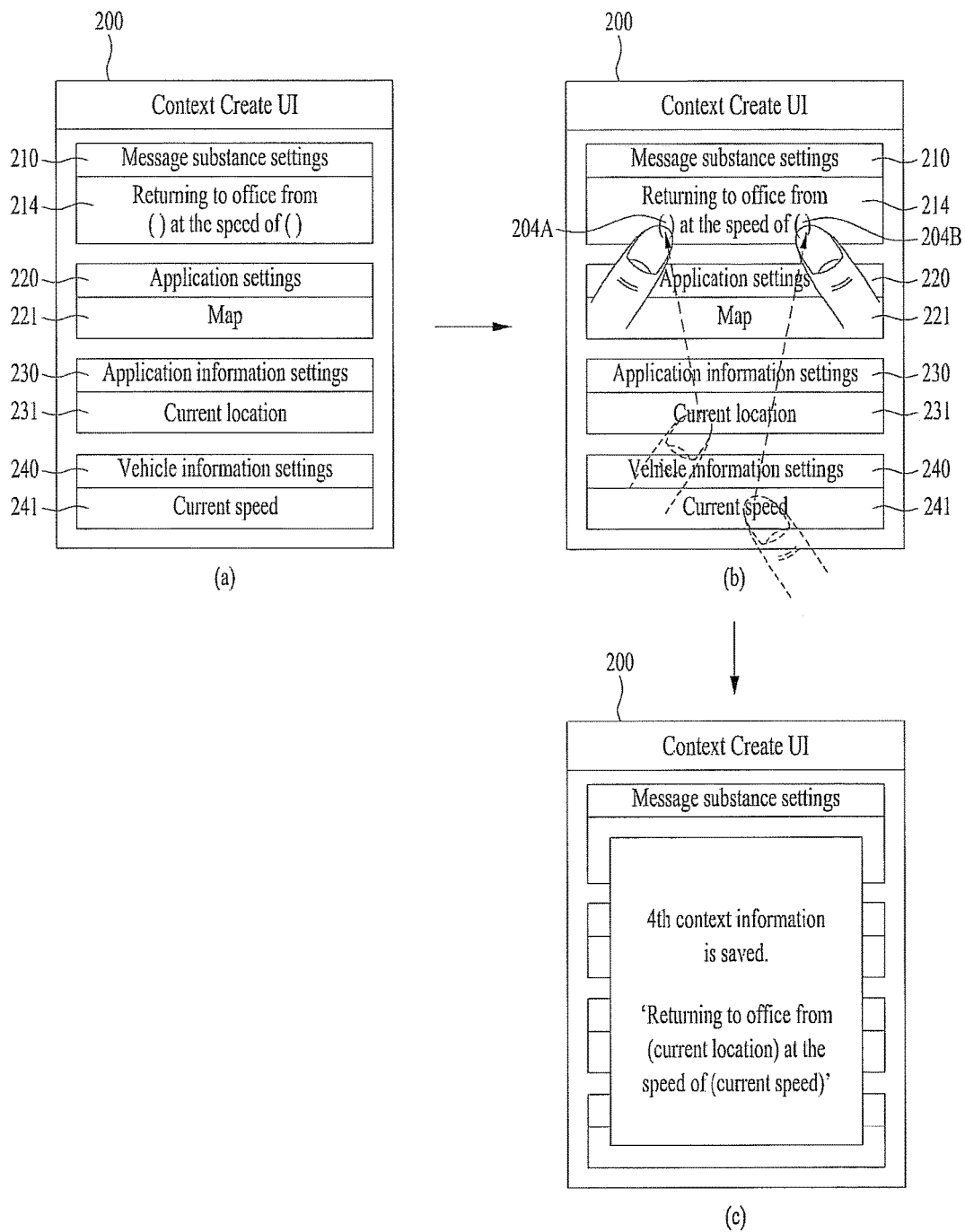

FIG. 13 and FIG. 14 are diagrams for examples of a process for creating a context information indicating an inclusive condition of information to be included in a content of a message to be sent in the course of driving a vehicle according to a $4^{th}$ embodiment of the present invention.

First of all, a $4^{th}$ context information created in FIGS. 12 to 14 indicates a combinable condition of an information provided by one application to a content of a message to be sent in the course of driving a vehicle and at last one vehicle information.

Referring to FIGS. 12 to 14, the controller 180 of the terminal 100 displays a UI (user interface) 200 for context information creation on a screen [S141].

If a user inputs a text or sentence corresponding to the content of the message to be sent through a message content setting window 210 of the UI 200, the controller 180 sets the text or sentence inputted through the message content setting window 210 as the content of the message to be sent [S142]. In this case, a contact of a receiving side of the message set by the user may be included in the content of the message.

Subsequently, if the user selects at least one application, which provides at least one information to be included in the content of the message to be sent, through an application setting window 220, the controller 180 sets the application selected through the application setting window 220 as the application providing the information to be included in the content of the message to be sent [S143].

Subsequently, if the user selects the information provided by the application through an application information setting window 230 and selects at least one vehicle information through a vehicle information setting window 240, and also selects $1^{st}$ and $2^{nd}$ positions for respectively inserting the information of the application and the vehicle information in the set message content, the controller 180 sets the selected $1^{st}$ and $2^{nd}$ positions in the message content as insertion positions of the information of the application and the vehicle information, respectively [S144].

In particular, if the application information setting window 230 is selected, the controller 180 displays an application information list of a type providable by the application and the user is then able to select a specific information, which will be included in the message content, from the application information list.

Moreover, the UI 200 shown in FIGS. 12 to 14 further includes the vehicle information setting window 240 for setting at least one vehicle information.

In particular, the user can set a type of at least one vehicle information to be included in the content of the message through the vehicle information setting window 240.

In doing so, the vehicle information, which can be set by the user through the vehicle information setting window 240, may include at least one of a current speed of a vehicle, a current gas mileage of the vehicle, a total driving distance of the vehicle, a drivable distance of the vehicle, a remaining gas level of the vehicle, a tire air pressure of the vehicle, a GPS location information, a navigation information (e.g., at least one of an origin, a stopover and a destination), etc.

In particular, if the vehicle information setting window 240 is selected, the controller 180 displays a vehicle information list of a type providable by the vehicle and the user is then able to select at least one vehicle information to be included in the message content from the vehicle information list.

The controller 180 controls the information including the content of the message to be sent by the steps S142 to S144, the information of the application to be attached to the message content, the vehicle information, the insertion position of the information of the application to be attached to the message content, and the insertion position of the vehicle information to be saved as a $4^{th}$ context information in the memory 160 [S145].

For instance, referring to FIG. 13 (a), a message content 214 indicating that 'returning to office from ( ) at the speed of ( )' is set in the message content setting window 210 of the UI 200 for the creation of the $4^{th}$ context information by a user. Applications for providing at least one information to be attached into the message content 214 are set to 'Map' 221 in the application setting window 220. 'Current location' 231 is set as a type of the at least one information, which is to be inserted in the message content 214, in the application information setting window 230. And, 'current speed' 241 is set as a type of the vehicle information to be inserted into the message content 214 in the vehicle information setting window 240.

If $1^{st}$ and $2^{nd}$ positions 204A and 204B, in which the 'current location' 231 and the 'current speed' 241 will be inserted, in a sentence of the message content 214 are designated by the user, respectively [FIG. 13 (b)], the controller 180 controls the set message content 214, the 'current location' 231 of the map 221 to be attached to the message content 214, the 'current speed' 241 of the vehicle information, and the insertion positions 204A and 204B of the 'current location' 231 and the 'current speed' 241 to be saved as the $4^{th}$ context information in the memory 160 [FIG. 13 (c)].

Meanwhile, in FIG. 13 (b), after the user has set the message content 214, the 'current location' 231 of the $1^{st}$ application 221 and the 'current speed' 241 in sequence, the user sets the insertion positions of the 'current location' 231 and the 'current speed' 241 in the message content 213. Alternatively, while the message content 214 is being written, the insertion positions of the 'current location' 231 and the 'current speed' 241 are set and the 'current location' 231 of the $1^{st}$ application 221 and the 'current speed' 241 can be then set.

Moreover, according to the present invention, referring to FIG. 12 and FIG. 13, the user can directly set the information 231 of the application 221 and the vehicle information 241, which are to be inserted in the message content 214 through the UI 200. Moreover, referring to FIG. 14, if the user inputs $1^{st}$ and $2^{nd}$ texts indicating a type of the information 231 of the application 221 and a type of the vehicle information 241, which are to be inputted in the message content 214, to desired positions within the message content 214, respectively, the controller 180 can search applications provided to the memory 160 for the application providing the information 231 of the type corresponding to the $1^{st}$ text and is able to acquire the vehicle information 241 corresponding to the $2^{nd}$ text from the vehicle.

In particular, FIG. 14 (a) shows that the $1^{st}$ text 211A indicating the type of the information 231 of the application to be inserted and the $2^{nd}$ text 214A indicating the type of the vehicle information 241 are included in the message content 214 inputted through the message content setting window 210.

In this case, if preset symbols (e.g., (,)) 211B1 and 211B2 are included in the message content 214, the controller 180 may recognize the $1^{st}$ text 'current location' 211A situated between the symbols 211B1 and 211B2 and the $2^{nd}$ text 'current speed' 214A situated between the symbols 211B1 and 211B2 as the types of the information to be inserted in the message content 214, respectively.

The controller 180 then searches the memory 160 for the application 221 providing the information 231 of the type corresponding to the recognized $1^{st}$ text 211A. Simultaneously, the controller 180 acquires the vehicle information 241 of the type corresponding to the recognized $2^{nd}$ text 214A from the vehicle.

In this case, if the terminal 100 according to the present invention includes the mobile terminal 100 communication connectible to the vehicle by wire/wireless, the controller 180 makes a request for the vehicle information 241 of the type corresponding to the recognized $2^{nd}$ text 214A to the vehicle via the communication unit 110 and is then able to receive the vehicle information 241 via the communication unit 110. If the terminal 100 according to the present invention includes a head unit of the vehicle, the controller 180 can receive and acquire the vehicle information 241 of the type corresponding to the recognized $2^{nd}$ text 214A from a corresponding sensor installed on the vehicle.

Thus, the controller 180 the insertion position of the information 231 of the found application 221, the insertion position of the acquired vehicle information 241 and the message content 214 to be saved as the $4^{th}$ context information in the memory 160 [FIG. 14 (b)].

In particular, referring to FIG. 13, the user completes the writing of the message content and is then able to directly set the insertion positions of the application information and the vehicle information by touching positions, into which the application information and the vehicle information will be inserted, respectively, in the message content. Alternatively, referring to FIG. 14, while the user is writing the message content, the user can set the application and vehicle information to be inserted in the message content and the insertion positions of the application information and the vehicle information together.

Meanwhile, as mentioned in the foregoing description, the $4^{th}$ context information may be created through the UI 200. Alternatively, the $4^{th}$ context information is received from an external terminal via the communication unit 110 and can be then saved in the memory 160.

Moreover, the controller 180 can transmit the $4^{th}$ context information to an external terminal via the communication unit 110 in response to a user's transmit command.

In the above descriptions, the process for creating the context information for defining the inclusive condition of the information to be included in the content of the message to be sent in case of sending the message in the course of driving the vehicle is explained in detail with reference to FIGS. 3 to 14.

In the following description, a following process according to the present invention is explained in detail with reference to FIGS. 15 to 23. First of all, if a message send command is inputted in the course of driving a vehicle, based on the context information created by the process shown in FIGS. 3 to 14, a message of a combined content of an information provided by an application of a terminal and a vehicle information is automatically created. Secondly, the created message is sent to a counterpart.

Figure 15:
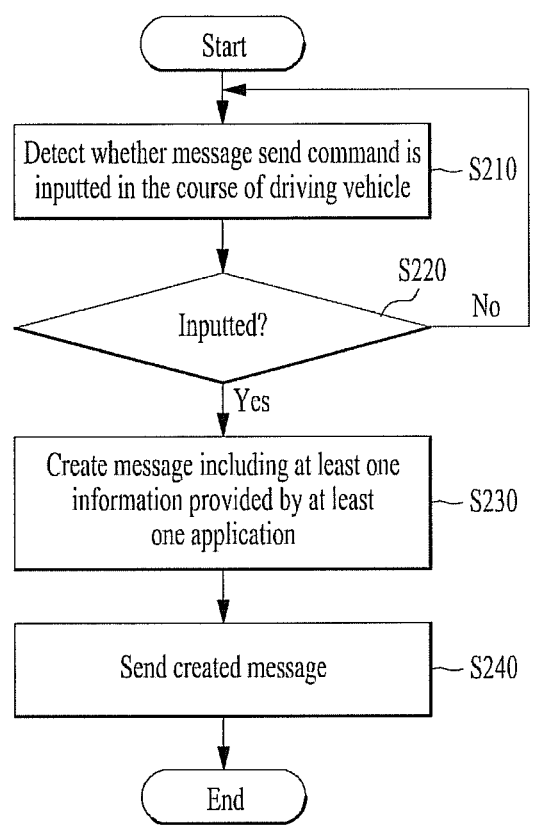
FIG. 15 is a flowchart of a process for creating and sending a message in the course of driving a vehicle based on a context information according to the present invention.

FIG. 15 is a flowchart of a process for creating and sending a message in the course of driving a vehicle based on a context information according to the present invention.

Referring to FIG. 15, while a vehicle is being driven, the controller 180 detects whether a message send command is inputted [S210].

In doing so, if the terminal 100 according to the present invention includes a vehicle head unit, the controller 180 measures a speed at the timing point of inputting the message send command through the speed sensor 142 provided to the terminal 100. If the measured speed is equal to or higher than a preset reference value, the controller 180 can determine that the vehicle is being driven. In this case, the reference value may include a speed of a slow moving vehicle in general.

Alternatively, in case that the terminal 100 according to the present invention includes the mobile terminal 100 capable of controlling operations of the vehicle by being communication-connected to the vehicle by wire/wireless, if the message send command is inputted, the controller 180 makes a request for a speed information of the vehicle to the vehicle via the communication unit 110 and then receives the speed information from the vehicle via the communication unit 110. If a speed corresponding to the received speed information of the vehicle is equal to or higher than the reference value, the controller 180 can determine that the vehicle is being driven.

Thus, if the controller 180 determines that the vehicle is being driven at the timing point of inputting the message send command [S220], the controller 180 creates a message including at least one information provided by at least one application provided to the memory 160 [S230][and then sends the created message to a corresponding message recipient via the communication unit 110 [S240].

In doing so, while the vehicle is being driven, if the message send command is inputted, the controller 180 displays a list of applications configured to provide functions interworkable with the message among a plurality of applications provided to the memory 160. If a specific application is selected from the list, the controller 180 creates a message including at least one information provided by the selected specific application and is then able to send the created message.

Moreover, while the vehicle is being driven and at least one application is active, if the message send command is inputted, the controller 180 creates a message including at least one information provided by the active at least one application and is then able to send the created message.

In doing so, in case that a $1^{st}$ context information created by the process shown in FIGS. 3 to 5 is saved in the memory 160, if the active at least one application is the application set in the $1^{st}$ context information, the controller 180 obtains an information corresponding to an information type set in the $1^{st}$ context information from the information of the type provided by the active at least one application, creates a message in a manner of inserting the obtained information into an insertion position of the information within a message content set in the $1^{st}$ context information, and then sends the created message.

Moreover, while the vehicle is being driven and at least one application is active, if the message send command is inputted, the controller 180 creates a message including at least two information provided by the active at least one application and is then able to send the created message.

In doing so, in case that a $2^{nd}$ context information created by the process shown in FIGS. 6 to 8 is saved in the memory 160, if the active at least one application is the application set in the $2^{nd}$ context information, the controller 180 obtains at least two information corresponding to at least two information types set in the $2^{nd}$ context information from the information of at least two types provided by the active at least one application, creates a message in a manner of inserting the obtained at least two information into insertion positions of the at least two information within a message content set in the $2^{nd}$ context information, and then sends the created message.

Moreover, while the vehicle is being driven and at least two $1^{st}$ and $2^{nd}$ applications are active, if the message send command is inputted, the controller 180 creates a message including at least two information respectively provided by the active at least two $1^{st}$ and $2^{nd}$ applications and is then able to send the created message.

In doing so, in case that a $3^{rd}$ context information created by the process shown in FIGS. 9 to 11 is saved in the memory 160, if the active at least two $1^{st}$ and $2^{nd}$ applications are the applications set in the $3^{rd}$ context information, the controller 180 obtains at least two information corresponding to at least two information types set in the $3^{rd}$ context information from the information of at least two types provided by the active at least two $1^{st}$ and $2^{nd}$ applications, creates a message in a manner of inserting the obtained at least two information into insertion positions of the at least two information within a message content set in the $3^{rd}$ context information, and then sends the created message.

Moreover, while the vehicle is being driven and at least one application is active, if the message send command is inputted, the controller 180 creates a message including an information provided by the active at least one application and at least one vehicle information of the moving vehicle and is then able to send the created message.

In doing so, in case that a $4^{th}$ context information created by the process shown in FIGS. 12 to 14 is saved in the memory 160, if the active at least one application is the application set in the $4^{th}$ context information, the controller 180 obtains an information corresponding to an information type set in the $4^{th}$ context information from the information of the type provided by the active at least one application, obtains a vehicle information of a type set in the $4^{th}$ context information from the vehicle, creates a message in a manner of inserting the obtained application information and the obtained vehicle information into an insertion position of the application information and an insertion position of the vehicle information within a message content set in the $4^{th}$ context information, respectively, and then sends the created message.

On the other hand, while the vehicle is being driven and at least one application is not active, if the message send command is inputted, the controller 180 is able to create a message to send by one of the processes shown in FIGS. 16 to 23 using one of the $1^{st}$ to $4^{th}$ context information created by the processes shown in FIGS. 3 to 14.

Figure 16:
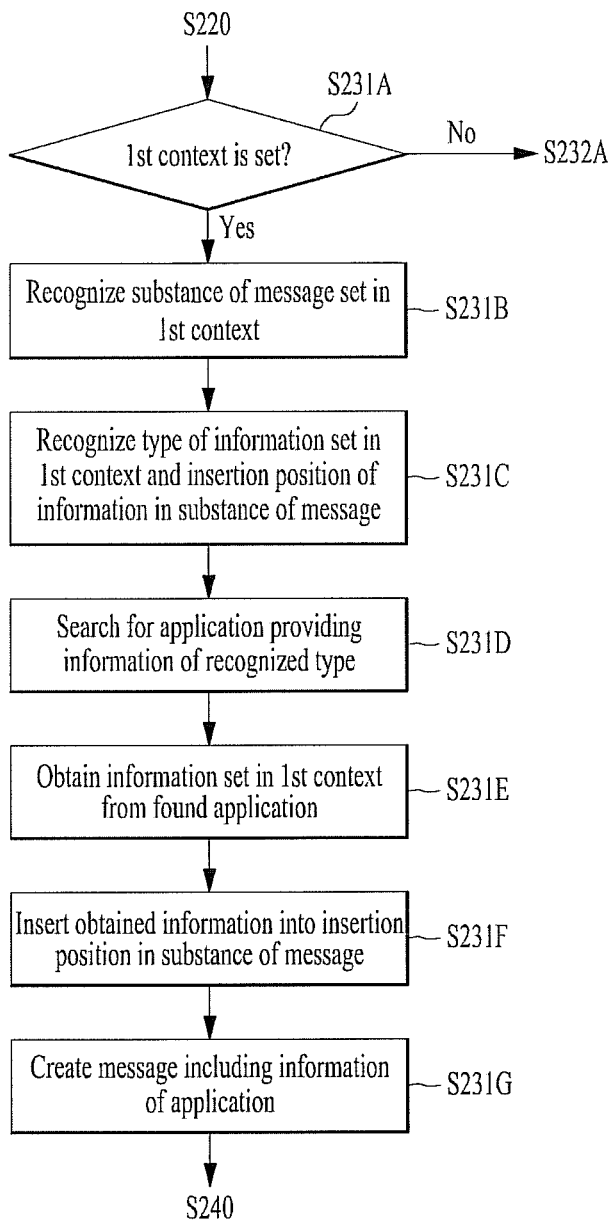
FIG. 16 is a flowchart of a process for creating and sending a message in the course of driving a vehicle based on a $1^{st}$ context information according to the present invention.

FIG. 16 is a flowchart of a process for creating and sending a message in the course of driving a vehicle based on a $1^{st}$ context information according to the present invention.

Figure 17:
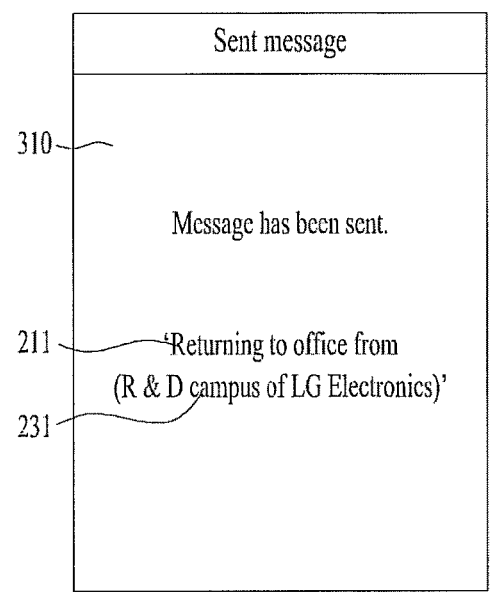
FIG. 17 is a diagram of a message created and sent in the course of driving a vehicle based on a $1^{st}$ context information according to the present invention.

FIG. 17 is a diagram of a message created and sent in the course of driving a vehicle based on a $1^{st}$ context information according to the present invention.

Referring to FIG. 16 and FIG. 17, a process for creating a message including at least one information provided by at least one application based on the 1$^{st}$ context information saved in the memory 160 and then sending the created message is shown.

In particular, while the vehicle is being driven, if a message send command is inputted, the controller 180 checks whether the 1$^{st}$ context information is set as a context information for creation of the message to be sent.

In this case, the 1$^{st}$ context information may include a context information saved in the memory 160 in a manner of being created by the process shown in FIGS. 3 to 5 or being received from an external terminal via the communication unit 110.

If the 1$^{st}$ context information is set as the context information for the creation of the message to be sent [S231A], the controller 180 recognizes a content 211 of the message set in the 1$^{st}$ context information by analyzing the 1$^{st}$ context information saved in the memory [S231B].

The controller 180 recognizes a type of an information set in the 1$^{st}$ context information and also obtains an insertion position of the information in the obtained message content 211 [S231C].

The controller 180 searches applications provided to the memory 160 for an application providing the information of the recognized type [S321D], obtains an information 231 of the recognized type by activating the found application 221 [S231E], and then inserts the obtained information 231 of the application 221 into the insertion position within the recognized message content 211 [S231F]. Thus, the controller 180 creates a message 310 including the information 231 of the application [S231G]. The controller 180 then sends the created message 310 [S240].

For instance, referring to FIG. 17, a message 310 including 'R & D campus of LG Electronics' (current location) 231 of an application 'Map' 221 within a message content 'returning to office from ( )' 211 set in a 1$^{st}$ context information is created and then sent.

In particular, the controller 180 inserts the 'R & D campus of LG Electronics' 231, which is the current location of the terminal 100 at the timing point of inputting the message send command through the application 'Map' 221, into the insertion position of the message content 211 set in the 1$^{st}$ context information, creates the message 310 of the content 211 including the 'R & D campus of LG Electronics' 231, and then sends the created message 310.

Figure 18:
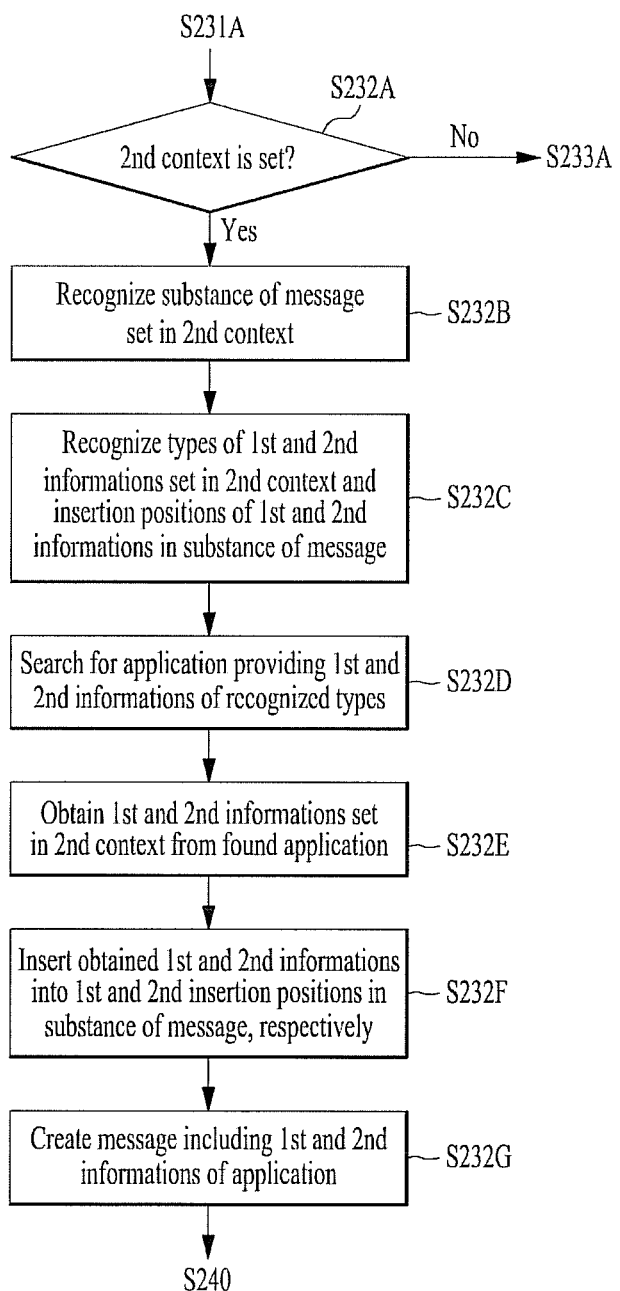
FIG. 18 is a flowchart of a process for creating and sending a message in the course of driving a vehicle based on a $2^{nd}$ context information according to the present invention.

FIG. 18 is a flowchart of a process for creating and sending a message in the course of driving a vehicle based on a 2$^{nd}$ context information according to the present invention.

Figure 19:
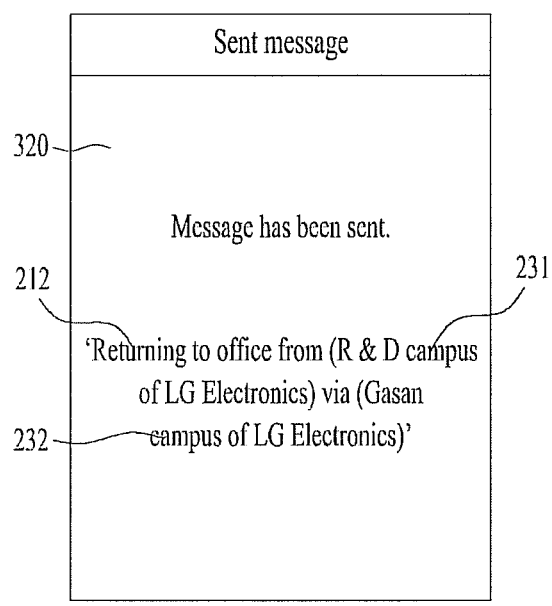
FIG. 19 is a diagram of a message created and sent in the course of driving a vehicle based on a $2^{nd}$ context information according to the present invention.

FIG. 19 is a diagram of a message created and sent in the course of driving a vehicle based on a 2$^{nd}$ context information according to the present invention.

Referring to FIG. 18 and FIG. 19, a process for creating a message including at least two 1$^{st}$ and 2$^{nd}$ information provided by at least one application based on the 2$^{nd}$ context information saved in the memory 160 and then sending the created message is shown.

In particular, while the vehicle is being driven, if a message send command is inputted, the controller 180 checks whether the 2$^{nd}$ context information is set as a context information for creation of the message to be sent.

In this case, the 2$^{nd}$ context information may include a context information saved in the memory 160 in a manner of being created by the process shown in FIGS. 6 to 8 or being received from an external terminal via the communication unit 110.

If the 2$^{nd}$ context information is set as the context information for the creation of the message to be sent [S232A], the controller 180 recognizes a content 212 of the message set in the 2$^{nd}$ context information by analyzing the 2$^{nd}$ context information saved in the memory 160 [S232B].

The controller 180 recognizes types of at least two 1$^{st}$ and 2$^{nd}$ information set in the 2nd context information and also recognizes insertion positions of the at least two 1$^{st}$ and 2$^{nd}$ information in the recognized message content 212, respectively [S232C].

The controller 180 searches applications provided to the memory 160 for an application 221 providing the 1$^{st}$ and 2$^{nd}$ information of the recognized types [S322D], obtains 1$^{st}$ and 2$^{nd}$ information 231 and 232 of the recognized types by activating the found application 221 [S232E], and then inserts the obtained 1$^{st}$ and 2$^{nd}$ information 231 and 232 into the insertion positions within the obtained message content 212, respectively [S232F]. Thus, the controller 180 creates a message 320 including the 1$^{st}$ and 2$^{nd}$ information 231 and 232 of the application 221 [S232G]. The controller 180 then sends the created message 320 [S240].

For instance, referring to FIG. 19, a message 320 including 'R & D campus of LG Electronics' (current location) 231 of an application 'Map' 221 and 'Gasan campus of LG Electronics' (stopover location) 232 within a message content 'returning to office from ( ) via ( )' 212 set in a 2$^{nd}$ context information is created and then sent.

In particular, the controller 180 inserts the 'R & D campus of LG Electronics' 231, which is the current location of the terminal 100 at the timing point of inputting the message send command through the application 'Map' 221, and the stopover location 'Gasan campus of LG Electronics' (stopover location) 232 into the insertion positions of the message content 212 set in the 2$^{nd}$ context information, respectively, creates the message 320 of the content 212 including the & D campus of LG Electronics' 231 and the 'Gasan campus of LG Electronics' (stopover location) 232, and then sends the created message 320.

Figure 20:
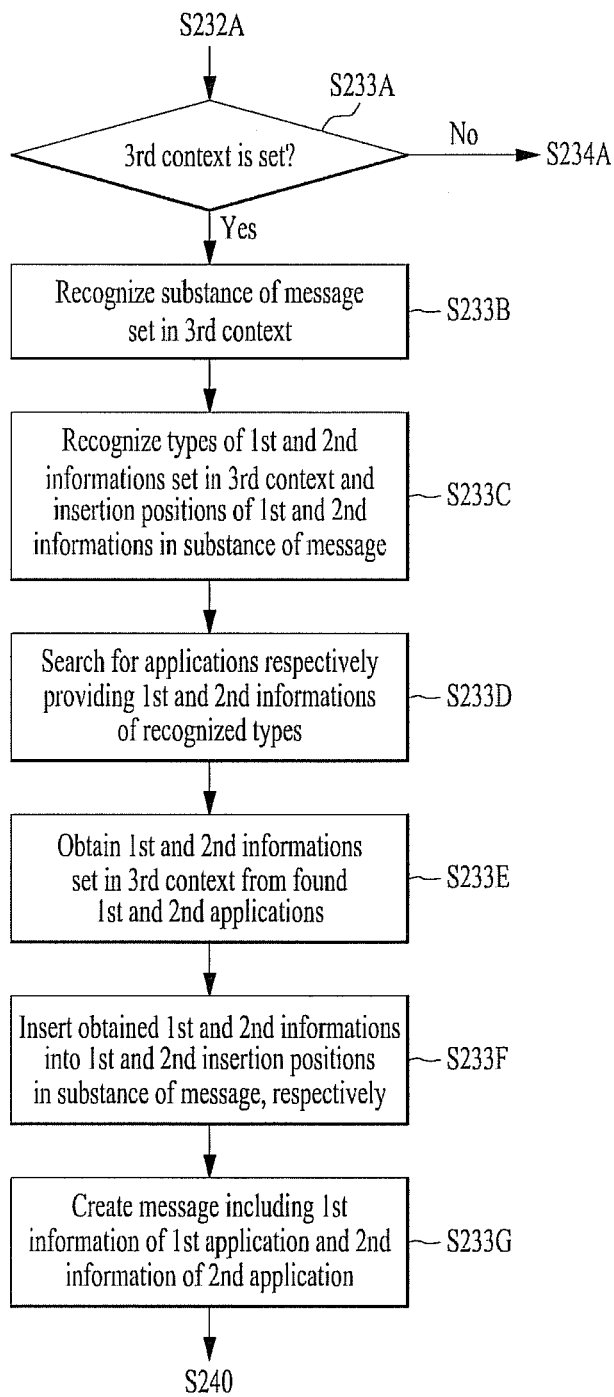
FIG. 20 is a flowchart of a process for creating and sending a message in the course of driving a vehicle based on a $3^{rd}$ context information according to the present invention.

FIG. 20 is a flowchart of a process for creating and sending a message in the course of driving a vehicle based on a 3$^{rd}$ context information according to the present invention.

Figure 21:
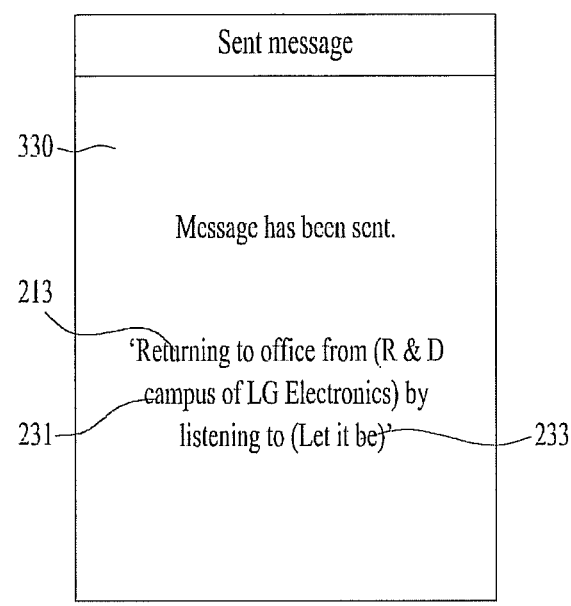
FIG. 21 is a diagram of a message created and sent in the course of driving a vehicle based on a $3^{rd}$ context information according to the present invention.

FIG. 21 is a diagram of a message created and sent in the course of driving a vehicle based on a 3$^{rd}$ context information according to the present invention.

Referring to FIG. 20 and FIG. 21, a process for creating a message including 1$^{st}$ and 2$^{nd}$ information respectively provided by at least two 1$^{st}$ and 2$^{nd}$ applications based on the 3$^{rd}$ context information saved in the memory 160 and then sending the created message is shown.

In particular, while the vehicle is being driven, if a message send command is inputted, the controller 180 checks whether the 3$^{rd}$ context information is set as a context information for creation of the message to be sent.

In this case, the 3$^{rd}$ context information may include a context information saved in the memory 160 in a manner of being created by the process shown in FIGS. 9 to 11 or being received from an external terminal via the communication unit 110.

If the 3$^{rd}$ context information is set as the context information for the creation of the message to be sent [S233A], the controller 180 recognizes a content 213 of the message set in the 3$^{rd}$ context information by analyzing the 3$^{rd}$ context information saved in the memory 160 [S233B].

The controller 180 recognizes types of the at least two 1$^{st}$ and 2$^{nd}$ information set in the 3$^{rd}$ context information and also recognizes insertion positions of the at least two 1$^{st}$ and 2$^{nd}$ information in the recognized message content 213, respectively [S233C].

The controller 180 searches applications provided to the memory 160 for $1^{st}$ and $2^{nd}$ applications 221 and 222 respectively providing the $1^{st}$ and $2^{nd}$ information of the recognized types [S233D], obtains $1^{st}$ and $2^{nd}$ information 231 and 233 of the recognized types by activating the found $1^{st}$ and $2^{nd}$ applications 221 and 222, respectively [S233E], and then inserts the obtained $1^{st}$ and $2^{nd}$ information 231 and 233 into the insertion positions within the obtained message content 213, respectively [S233F]. Thus, the controller 180 creates a message 330 including the $1^{st}$ and $2^{nd}$ information 231 and 233 of the applications 221 and 222 [S233G]. The controller 180 then sends the created message 330 [S240].

For instance, referring to FIG. 21, a message 330 including 'R & D campus of LG Electronics' (current location) 231 of an application 'Map' 221 and 'Let it be' (song title for play) 233 within a message content 'returning to office from ( ) by listening to ( )' 213 set in a $3^{rd}$ context information is created and then sent.

In particular, the controller 180 obtains the 'R & D campus of LG Electronics' 231, which is the current location of the terminal 100 at the timing point of inputting the message send command through the application 'Map' 221, inserts the 'R & D campus of LG Electronics' 231 and the 'Let it be' 233, which is the title of the song played via the application 'media player' 222 at the time of inputting the message send command, into the insertion positions of the message content 213 set in the $3^{rd}$ context information, respectively, creates the message 330 of the content 213 including the 'R & D campus of LG Electronics' 231 and the 'Let it be' 233, and then sends the created message 330.

Figure 22:
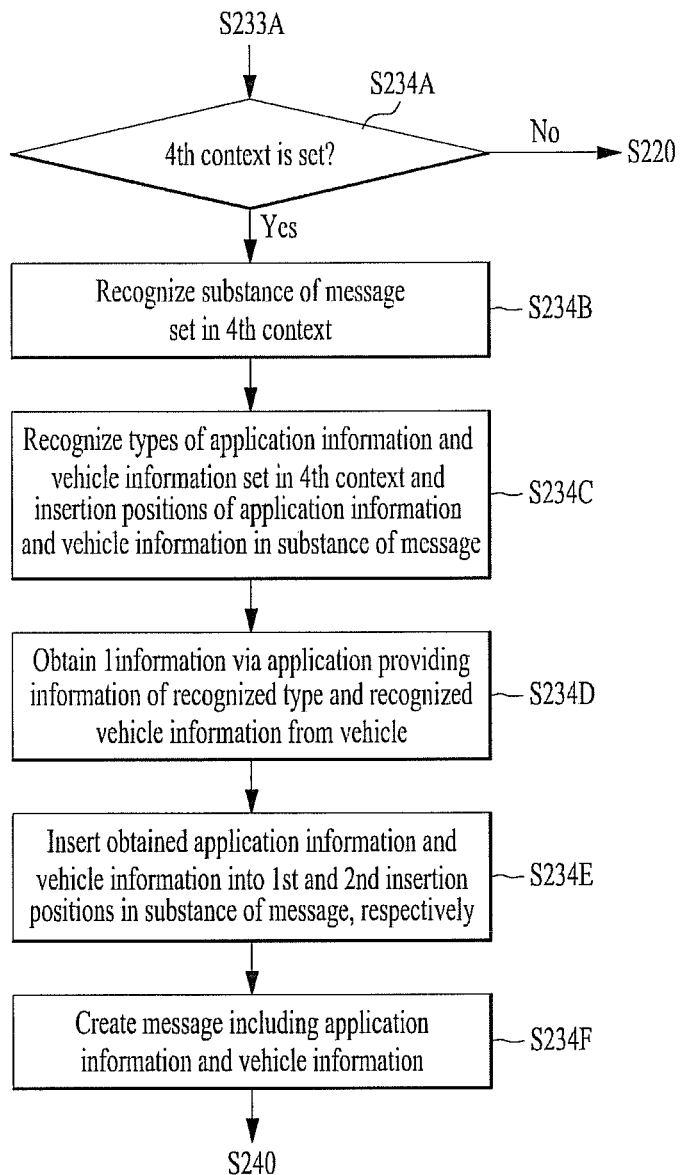
FIG. 22 is a flowchart of a process for creating and sending a message in the course of driving a vehicle based on a $4^{th}$ context information according to the present invention.

FIG. 22 is a flowchart of a process for creating and sending a message in the course of driving a vehicle based on a $4^{th}$ context information according to the present invention.

Figure 23:
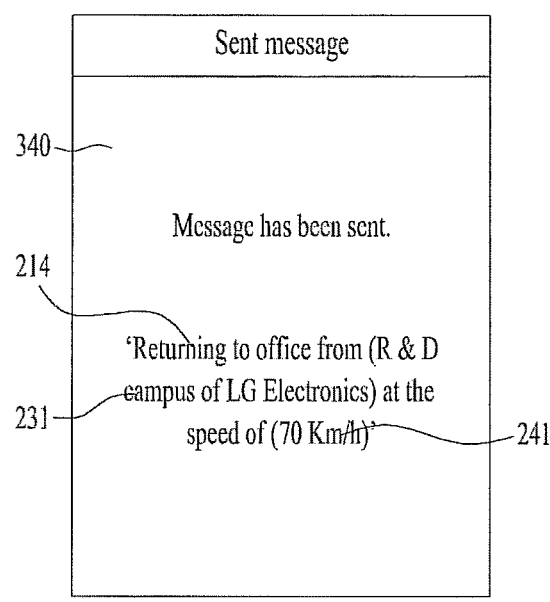
FIG. 23 is a diagram of a message created and sent in the course of driving a vehicle based on a $4^{th}$ context information according to the present invention.

FIG. 23 is a diagram of a message created and sent in the course of driving a vehicle based on a $4^{th}$ context information according to the present invention.

Referring to FIG. 22 and FIG. 23, a process for creating a message including an information provided by at least one application and at least one vehicle information based on the $4^{th}$ context information saved in the memory 160 and then sending the created message is shown.

In particular, while the vehicle is being driven, if a message send command is inputted, the controller 180 checks whether the $4^{th}$ context information is set as a context information for creation of the message to be sent.

In this case, the $4^{th}$ context information may include a context information saved in the memory 160 in a manner of being created by the process shown in FIGS. 12 to 14 or being received from an external terminal via the communication unit 110.

If the $4^{th}$ context information is set as the context information for the creation of the message to be sent [S234A], the controller 180 recognizes a content 214 of the message set in the $4^{th}$ context information by analyzing the $4^{th}$ context information saved in the memory 160 [S234B].

The controller 180 recognizes a type of the information set in the $4^{th}$ context information and a type of the vehicle information and also recognizes insertion positions of the application information and the vehicle information in the recognized message content 214, respectively [S234C].

The controller 180 searches applications provided to the memory 160 for the application 221 providing the information of the recognized type, obtains the information 231 of the recognized type by activating the found application 221, and also obtains the vehicle information 241 of the obtained type from the vehicle [S234].

In this case, if the terminal 100 according to the present invention includes the mobile terminal 100 communication-connectible to the vehicle by wire/wireless, the controller 180 makes a request for the vehicle information 241 of the obtained type to the vehicle via the communication unit 110 and is then able to receive the vehicle information 241 from the vehicle via the communication unit 110. If the terminal 100 according to the present invention includes a head unit of the vehicle, the controller 180 can receive and acquire the vehicle information 241 of the obtained type from a corresponding sensor installed on the vehicle.

In doing so, the vehicle information 241 of the obtained type may include at least one of a current speed of a vehicle, a current gas mileage of the vehicle, a total driving distance of the vehicle, a drivable distance of the vehicle, a remaining gas level of the vehicle, a tire air pressure of the vehicle, a GPS location information, a navigation information (e.g., at least one of an origin, a stopover and a destination), etc.

Subsequently, the controller 180 inserts the obtained information 231 of the application 221 and the vehicle information 241 into the insertion positions within the obtained message content 214, respectively [S234E]. Thus, the controller 180 creates a message 340 including the information 231 of the application 221 and the vehicle information [S234F]. The controller 180 then sends the created message 340 [S240].

For instance, referring to FIG. 23, a message 340 including 'R & D campus of LG Electronics' (current location) 231 of an application 'Map' 221 and a vehicle information '70 km/h' (current speed) 241 within a message content 'returning to office from ( ) at the speed of ( )' 214 set in a $4^{th}$ context information is created and then sent.

In particular, the controller 180 obtains the 'R & D campus of LG Electronics' 231, which is the current location of the terminal 100 at the timing point of inputting the message send command through the application 'Map' 221, inserts the 'R & D campus of LG Electronics' 231 and the current speed '70 km/h' 241 of the vehicle at the timing point of inputting the message send command from the vehicle into the insertion positions of the message content 214 set in the $4^{th}$ context information, respectively, creates the message 340 of the content 214 including the 'R & D campus of LG Electronics' 231 and the '70 km/h' 241, and then sends the created message 340.

Accordingly, embodiments of the present invention provide various effects and/or features.

First of all, a driver of a moving vehicle automatically creates and sends a message including application and vehicle information suitable for a predetermined forma by a single manipulation, thereby facilitating the message to be sent safely and conveniently in the course of driving the vehicle.

It will be appreciated by those skilled in the art that the present invention can be specified into other form(s) without departing from the spirit or scope of the inventions.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A terminal, which is provided to a vehicle, comprising:
a communication unit;
a display unit;
a memory provided with at least one application;
a controller configured to:
control the display unit to display a context information creation screen and to display at least one information type list in response to an input to select at least one application,
select at least one information type in the at least one information type list by touch input,
control the memory to store context information including a message content, the selected at least one information type, an inserting position of the at least one information type within the message content, and the selected at least one application providing the selected at least one information type,
generate a complete message combining the message content and at least one information, obtained from the vehicle, corresponding to the selected at least one information type in the inserting position in response to an input of a message send command, and
control the communication unit to transmit the generated complete message,
wherein the memory is configured to save second context information, in which a combinable condition of at least two information provided by the application is set, and
wherein when the application provides the at least two information, the controller is further configured to:
create a message substance that includes a combination of the at least two information based on the second context information,
transmit the message including the created substance,
display a UI (user interface) for creation of the second context information, and
save information including the set message substance and insertion positions of the at least two information as the second context information when the substance of the message to be transmitted via the UI is set and positions for respectively inserting the at least two information in the substance are set via the UI.

2. The terminal of claim 1, wherein while the at least one application is active and the vehicle if being driven, when the message send command is inputted, the controller is further configured to create the message.

3. The terminal of claim 1, further comprising a speed sensor configured to periodically measure a speed of the terminal, wherein when the speed measured by the speed sensor is equal to or higher than a reference value, the controller is further configured to determine that the vehicle is being driven.

4. The terminal of claim 1, wherein the communication unit is communication-connected to the vehicle and periodically receives information indicating a speed of the vehicle from the vehicle and wherein when the vehicle speed received via the communication unit is equal to or higher than a preset reference value, the controller is further configured to determine that the vehicle is being driven.

5. The terminal of claim 1, wherein the memory is further configured to save first context information having an inclusive condition of a specific information of the application set in a substance of the message, and
wherein the controller is configured to:
create the substance of the message including the specific information in information provided by the application based on the first context information,
transmit the message including the created substance.

6. The terminal of claim 1, wherein the second context information comprises the substance of the message to be transmit and the positions, into which the at least two information will be inserted, respectively, set within the substance.

7. The terminal of claim 1, wherein the second context information is saved by being received from an external terminal via the communication unit.

8. The terminal of claim 1, wherein the controller is further configured to transmit the second context information to an external terminal via the communication unit.

9. The terminal of claim 1, wherein while the vehicle is being driven and at least two applications are active, when the message transmission command is inputted, the controller is further configured to:
create a message substance of a combination of information respectively provided by the at least two application, and
transmit the message including the created substance.

10. The terminal of claim 9, wherein the memory is further configured to save third context information, in which an combinable condition of two information provided by the at least two applications is set, and
wherein the controller is configured to:
create a message substance of a combination of the information respectively provided by the at least two applications based on the third context information, and
transmit the message including the created substance.

11. The terminal of claim 10, wherein the controller is further configured to:
display a UI (user interface) for creation of the third context information and wherein when the substance of the message to be transmit via the UI is set and positions for respectively inserting the information of the at least two applications in the substance are set via the UI, and
save an information including the set message substance and the insertion positions of the information of the at least two applications as the third context information.

12. The terminal of claim 10, wherein the third context information comprises the substance of the message to be transmit and the positions, into which the information of the at least two applications will be inserted, respectively, set within the substance.

13. The terminal of claim 1, wherein when the message transmission command is inputted, the controller is further configured to:
obtain at least one vehicle information related to the vehicle currently being driven,
create a message substance of a combination of the obtained at least one vehicle information and the at least one information provided by the at least one application, and
transmit the message including the created substance.

14. The terminal of claim 13, wherein the memory is further configured to save fourth context information, in which an combinable condition of the vehicle information and the information of the application is set, and wherein the controller is further configured to:
create a message substance of a combination of the obtained at least one vehicle information and the at least one information of the application based on the fourth context information, and
transmit the message including the created substance.

15. The terminal of claim 14, wherein the controller is further configured to display a UI (user interface) for creation of the fourth context information and
wherein when the substance of the message to be transmit via the UI is set, the controller is further configured to save information including an insertion position of the obtained at least one vehicle information and an insertion position of the at least one information of the application within the substance via the UI as the fourth context information.

16. The terminal of claim 14, wherein the fourth context information comprises the substance of the message to be transmit and the positions, into which the obtained at least one vehicle information and the at least one information of the application will be inserted, respectively, set within the substance.

17. The terminal of claim 13, wherein the controller is further configured to:
receive the at least one vehicle information from the vehicle via the communication unit, and
obtain the received at least one vehicle information from the vehicle.

18. The terminal of claim 1, wherein the at least one information obtained from the vehicle includes at least one of a current speed of the vehicle, a current gas mileage of the vehicle, a total driving distance of the vehicle, a drivable distance of the vehicle, a remaining gas level of the vehicle and a tire air pressure of the vehicle.

19. A method of controlling a terminal, which is provided to a vehicle, comprising:

displaying a context information creation screen and at least one information type list in response to an input to select at least one application;
selecting at least one information type in the at least one information type list by touch input;
storing context information including a message content, the selected at least one information type, an inserting position of the at least one information type within the message content, and the selected at least one application providing the selected at least one information type;
generate a complete message combining the message content and at least one information, obtained from the vehicle, corresponding to the selected at least one information type in the inserting position in response to an input of a message send command;
transmitting the generated complete message;
creating a message substance that includes a combination of the at least two information based on the second context information when the memory is configured to save second context information, in which a combinable condition of at least two information provided by the application is set, and the application provides the at least two information;
transmitting the message including the created substance;
displaying a UI (user interface) for creation of the second context information; and
saving information including the set message substance and the insertion positions of the at least two information as the second context information when the substance of the message to be transmitted via the UI is set and positions for respectively inserting the at least two information in the substance are set via the UI.

* * * * *